United States Patent [19]

Nishio

[11] Patent Number: 4,868,743
[45] Date of Patent: Sep. 19, 1989

[54] TRAVERSAL METHOD OF PROCESSING TREE STRUCTURE INFORMATION AND APPARATUS USING THE SAME

[75] Inventor: Takanori Nishio, Yokohama, Japan

[73] Assignee: Hitachi, Ltd., Tokyo, Japan

[21] Appl. No.: 123,777

[22] Filed: Nov. 23, 1987

[30] Foreign Application Priority Data

Nov. 25, 1986 [JP] Japan ............................. 61-280032
Jan. 20, 1987 [JP] Japan ................................ 62-10190

[51] Int. Cl.$^4$ ............................................. G06F 7/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,318,184 | 3/1982 | Millett et al. ........................ | 364/900 |
| 4,553,206 | 11/1985 | Smutek et al. ....................... | 364/300 |
| 4,692,896 | 9/1987 | Sakoda et al. ........................ | 364/900 |
| 4,730,348 | 3/1988 | MacCrisken ......................... | 364/200 |
| 4,742,471 | 5/1988 | Yoffa et al. ........................... | 364/300 |
| 4,752,890 | 6/1988 | Natarajan ............................. | 364/900 |
| 4,763,277 | 8/1988 | Ashford et al. ...................... | 364/900 |
| 4,777,617 | 10/1988 | Frisch et al. .......................... | 364/300 |

*Primary Examiner*—David Y. Eng
*Attorney, Agent, or Firm*—Fay, Sharpe, Beall, Fagan, Minnich & McKee

[57] ABSTRACT

A traversal method having a memory for storing tree structure data having nodes, each node including an attribute indicating a traversal stage in the tree structure in which an evaluation result of an attribute corresponding to the traversal state of each node of the tree structure data is stepwise arranged according to a depth-first order in the memory in a sequential fashion, the memory including two memories. In this method, the system recognizes as a sub-tree a group of nodes which have a same kind and which are linked with each other, sequentially arranges, during a traversal of a root of the sub-tree, symbols indicating an initiate position of the sub-tree and an end position thereof, and a symbol indicating an intermediate position of the sub-tree in a first memory. The system copies, while searching a series of data thus sequentially arranged for each kind, the initiate symbol, the intermediate symbol, and the end symbol of the sub-tree not belonging to the kind onto second memory. When the initiate symbol of a sub-tree belonging to the kind is detected, an activation of a traversal of the sub-tree is indicated, and when the intermediate and end symbols are detected, a reactivation of a traversal of the sub-tree is indicated. In response to the indication, a traversal of the sub-tree belonging to the kind is executed so as to develop an attribute of the sub-tree in the second memory.

5 Claims, 16 Drawing Sheets

| LOCATION OF NODE | KIND OF NODE | MARK |
|---|---|---|

| | | | |
|---|---|---|---|
| TOP | 1 | A | INITIATE |
| | 4 | C | INITIATE |
| | 5 | B | INITIATE |
| | | B | END |
| | | C | END |
| | | A | INTER-MEDIATE |
| | 9 | B | INITIATE |
| | 11 | A | INITIATE |
| | | A | END |
| | | B | INTER-MEDIATE |
| | 13 | C | INITIATE |
| | | C | END |
| | | B | INTER-MEDIATE |
| | 14 | A | INITIATE |
| | | A | END |
| | | B | END |
| END | | A | END |

INITIATE : INITIATE SYMBOL

INTERMEDIATE : INTERMEDIATE SYMBOL

END : END SYMBOL (A (C (B), B (D, C, A)))

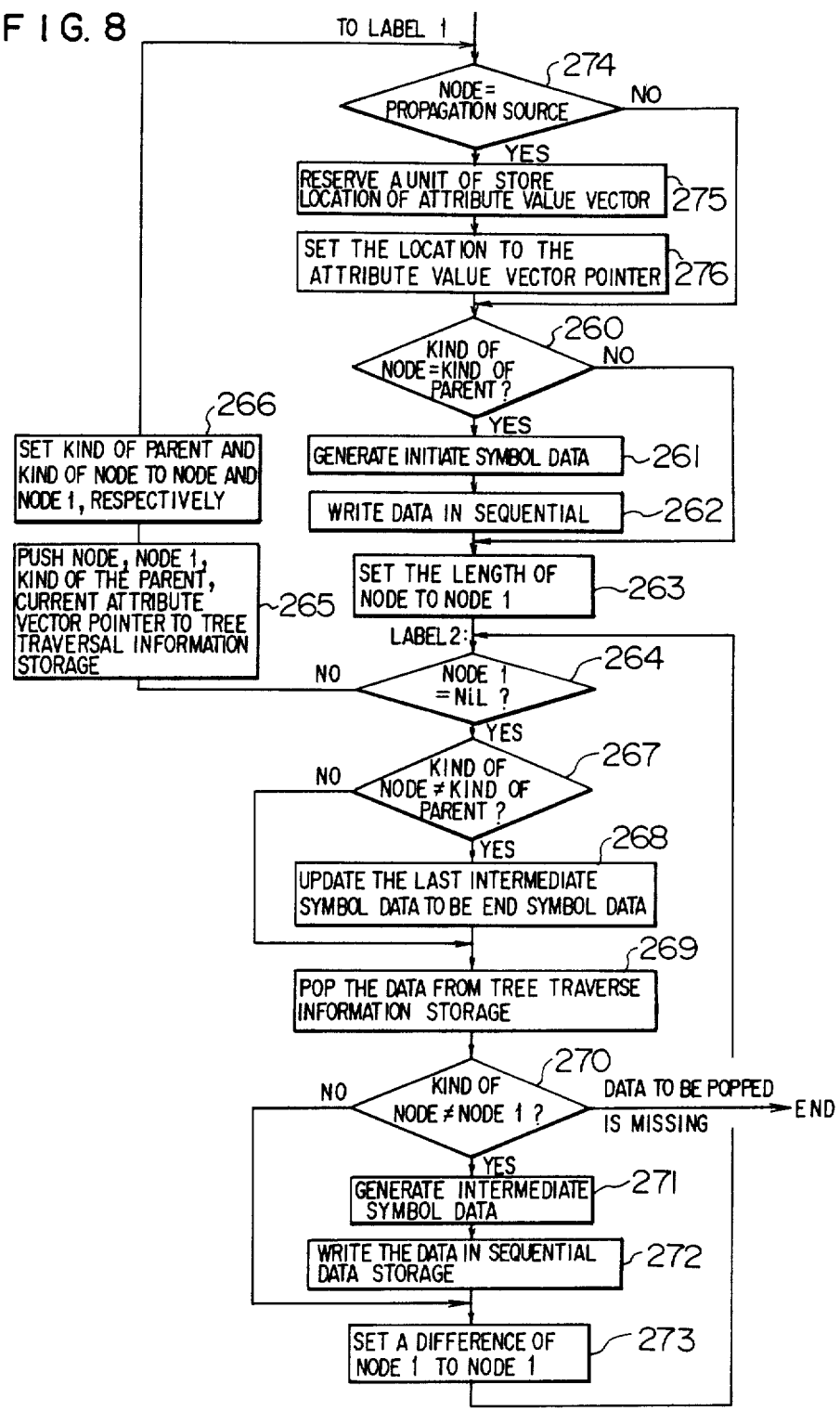

F I G. 15
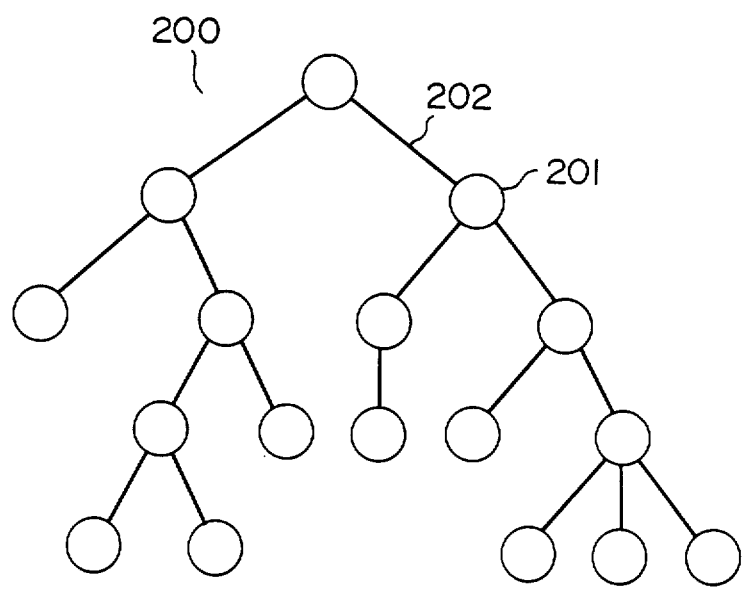

TRAVERSAL METHOD OF PROCESSING TREE STRUCTURE INFORMATION AND APPARATUS USING THE SAME

BACKGROUND OF THE INVENTION

The present invention relates to a traversal method in processing tree structure information, and in particular, to a traversal method and an apparatus using the same, the method being capable of increasing an efficiency of a traversal of a tree when evaluation of information of nodes constituting the tree prior to or during a tree traversal is difficult.

A method in which data of a tree structure is subjected to a traversal or scanned to effect processing based on information of nodes of the tree structure according to the sequence of the traversal of the nodes has often been employed in various software including a compiler.

The object data of the scanning or traversal constitutes, for example, as shown in FIG. 15, a tree structure 200 having nodes 201 as components thereof and branches 202 connecting nodes. Furthermore, among the nodes 201 of the tree structure, the nodes at the upper-most position is called a root and a node which is not connected to a node therebelow is referred to as a leaf. In addition, for the relationship between nodes 201 connected to each other by a branch 202, a node y connected to a node x and is located immediately therebelow is called a child of the node x, which is in turn referred to as a parent. Moreover, for the relationship of nodes sharing a parent, children on the left-hand and right-hand sides of the parent node x are respectively referred to as an elder child and a younger child, whereas a node on the right-hand side of the node x is named as a younger brother of the node x, which is accordingly referred to as the elder brother.

Incidentally, since these nodes configure a tree structure, each node retains the positions of data of the elder child and younger brother thereof. Furthermore, if there does not exist the elder child or the younger brother, a special value, nil is retained in place of the location thereof.

When effecting a traversal of a tree having such a structure, a depth-first-search is achieved, namely, starting from the root of the tree, the traversal is accomplished downward from the child at the left-most position. When all children of this sequence are completely searched, the similar search is executed from the child at the second left-most position. This operation is repeatedly effected toward the right-most location.

Furthermore, in a case where an operation is to be executed for each node during the search, there is used method in which the tree traversal is achieved in a sequence including all of a preorder in which the root is first processed for the operation for each node, an in order in which the root is processed at an intermediate point for the operation, and a post-order in which the root is finally processed, thereby sequentially arranging data according to the processing order.

For example, as shown in FIG. 16(a) a node R has three children. Applying the method above to the tree structure including sub-trees a-c to effect the tree traversal and to sequentially arrange data, there are sequentially attained in an arrangement a result $R_1$ of the tree traversal (preorder) of the node R before the sub-trees a-c, a result $R_2$ of the tree traversal (in order) of the node R between the sub-trees a and c, a result $R_3$ of the tree traversal (in order) between the sub-trees b and c, and a result $R_4$ of the tree traversal (postorder) of the node R after the sub-trees a-b.

As a consequence, in a tree traversal, the node assigned as an object of the tree traversal at present possesses states of which the number is expressed as the total of the children thereof +1. These states are referred to as traversal stages of the node and is represented by integers ranging from 0 to the total of the children thereof. Each node is provided with an attribute of each traversal stage, namely, contents $R_1$-$R_4$ to be sequentially arranged or information indicating the contents $R_1$-$R_4$.

The tree traversal method of this kind is particularly applied to cases, for example, a case where evaluation of the attributes of all nodes can be accomplished at a low cost prior to the start of the tree traversal or a case where although the evaluation of the respective attributes can be achieved according to the order of processing or visiting of nodes when the tree traversal is effected.

However, in a case where nodes are dependent on each other and hence the entire tree must undergo a tree traversal to evaluate attributes of a node or in a case where a great amount of information is required for the evaluation of the attribute and consequently the attributes of all nodes cannot be arranged through a tree traversal, the sequence of evaluation of attributes of each node is restricted. If the evaluation sequence does not agree with the tree traversal order on each node in the tree traversal, the respective operations cannot be achieved according to the method above.

For example, according to the method described in the "Algorithm+Data Structure=Program", N. Wirth (translated by Takuya Katayama), 1979, the Computer Association of Japan, the entire tree undergoes a tree traversal beginning from the root of the tree structure so as to effect processing according to the preorder, inorder, and postorder, respectively. As a consequence, in a case where the nodes to be processed or visited in a tree traversal are restricted, the tree traversal must be repetitiously accomplished for the entire tree including the nodes not to be processed in the pertinent tree traversal.

Furthermore, in such a method, when an attribute propagation occurs from a node to the descendant thereof, it is necessary to dispose a common area to store the entire information to be propagated and to refer to the information each time a search is carried out for a node, which disadvantageously necessitates a large common area.

According to the prior art technology, in a case where the nodes to be processed in a tree traversal are restricted, the entire tree is repeatedly subjected to the traversal, which leads to a problem that the processing efficiency is deteriorated.

Furthermore, such cases have not been taken into consideration as cases where processing of nodes associated with different processing objects causes an interference therebetween, for example, where the processing results of each node are to be sequentially arranged in a structure.

Moreover, considerations have not been given to a case associated with an occurrence of an attribute propagation from a node to the descendant thereof in which a timing of the generation of the propagation attribute at the node is different from a timing of evaluation of nodes of the descendance through reference to the propagation attribute.

SUMMARY OF THE INVENTION

It is therefore an object of the present invention to provide a method which is capable of improving the processing efficiency when a plurality of tree traversals must be achieved and which is capable of attaining a correct processing result even when the processing results of the respective traversals cause an interference and to provide an apparatus using the same, thereby removing the problems of the prior art technology.

Another object of the present invention is to provide a tree traversal method capable of improving the processing efficiency when a plurality of tree traversals must be achieved and which is capable of propagating attributes even when the tree traversal is achieved at a different timing, thereby removing the problems of the prior art technology.

To achieve these objects, the first feature of the present invention resides in that there is provided means for storing data in a tree structure including nodes, each node having an attribute indicating a traversal stage in the tree structure and a kind restricting an order to evaluate the attribute for each node. In a tree traversal apparatus to effect according to the attribute evaluating order a processing to sequentially arranging an evaluation result of an attribute corresponding to a traversal stage of each node in the tree structure data according to the attribute evaluation order, the memory includes two memories and there are provided a first processing step in which a group of connected nodes having the same kind are recognized as a sub-tree, symbols indicating that nodes are at the start position and at the end position are sequentially arranged in the preorder and in the postorder at a traversal of a root of the sub-tree, symbols indicating that a node is at an intermediate position of the sub-tree is sequentially arranged in one of the memories when control returns from a traversal of a child having a kind different from the kind in each leaf of the sub-tree, a second processing step in which while searching a series of data sequentially arranged for each kind by the first processing step, a start symbol, an intermediate symbol, and an end symbol of a sub-tree not belonging to the kind are copied onto the other one of the memories; when a start symbol of a sub-tree belonging to the kind is detected, an activation of a traversal is indicated, and when an intermediate symbol and an end symbol are detected, a reactivation of a traversal of the sub-tree is indicated, and a third processing step in which a traversal of a sub-tree belonging to the kind is achieved according to an indication of the second processing step wherein the first processing step develops the series of sequential data, the second processing step searches the sequential data series, and the third processing step activates a traversal of a sub-tree when a start indication is received from the second processing step; when a node having a kind different from the kind is detected, the third step temporarily inactivating the traversal; the second processing step again searches the sequential data series stored in said one of the memories, and the third processing step reactivates the sub-tree traversal when an indication for a reactivation is received from the second processing step so as to effect a processing to develop attributes of a sub-tree belonging to the kind in said other one of the memories in concurrence with the traversal.

To achieve these objects, the second feature of the present invention resides in that there is provided means for storing data in a tree structure including nodes, each node includes an attribute indicating a traversal stage in a tree structure before a traversal of a first child of a node or after a traversal of an i-th child if i is an integer which is greater than 1 and which does not exceed the total number of the children of the node and a kind restricting an evaluation order of the attributes for each node. In a tree traversal apparatus to effect, according to the attribute evaluating order, a processing to sequentially arranging an evaluation result of an attribute corresponding to a traversal stage of each node in the tree structure data according to the attribute evaluation order, the memory includes two memories and there are provided a first processing step in which when an attribute possessed by a node must be referenced when an attribute of the descendant of the node is evaluated, a group of nodes connected to each other having the same kind are recognized as a sub-tree; a node producing information of a propagation object is assumed to be a root; of the descendant of the node, an area excepting a node (separation point) at the higher-most level for which propagation information is not referenced is recognized as an area for which propagation information can be propagated; an attribute value vector keeping all propagation information is retained in a source of the propagation, an attribute value vector pointer indicating a location where the attribute vector is retained; when a root of each sub-tree undergoes a traversal, symbols indicating that nodes are at a start position and an end position of a sub-tree for which a location of the attribute value vector of a propagation source of a nearest ancestor of the root are sequentially arranged in the preorder and the postorder; a symbol indicating that a node locates at an intermediate point of the sub-tree is sequentially arranged in one of the two memories when control returns from a traversal of a child having a kind different from the kind in each leaf of the sub-tree, a second processing step in which while searching a series of data sequentially arranged for each kind by the first processing step, a start symbol, an intermediate symbol, and end symbol of a sub-tree not belonging to the kind are copied onto the other one of the memories; when a start symbol of a sub-tree belonging to the kind is detected, an activation of a traversal thereof is indicated, and when an intermediate symbol and an end symbol are detected, a reactivation of a traversal of the sub-tree is indicated, and a third processing step in which a traversal of a sub-tree belonging to the kind is achieved according to an indication of the second processing step wherein the first processing step develops the series of sequential data, the second processing step searches the sequential data series, and the third processing step activates a traversal of a sub-tree when a start indication is received from the second processing step; when a node having a kind different from the kind is detected, the third processing step temporarily inactivating the traversal; the second processing step again searches the sequential data series stored in said one of the memories, and the third processing step reactivates the sub-tree traversal when an indication for a reactivation is received from the second processing step so as to effect a processing to develop attributes of a sub-tree belonging to the kind in said other one of the memories in concurrence with the traversal.

In the present invention, a kind of a group of nodes to be the objective of each traversal is colored and a group of nodes connected to each other having the same color is regarded as a sub-tree to be controlled, namely, calls are effected between the sub-tree traversal and the control in a coroutine fashion.

Furthermore, for propagation information, an area in which propagation information can be propagated is recognized to be a sub-tree different from the sub-tree having the kind, a location (attribute value vector) where the value of an attribute to be propagated is set is beforehand reserved in a propagation source, and the location is retained in header information of a sub-tree traversal so as to be propagated from a sub-tree to a sub-tree at a lower-level.

That is, since a group of sub-trees are controlled as a parenthesis structure in which a root of each sub-tree is used as an identifier, the parenthesis structure is copied during a traversal. When a sub-tree of a kind assigned as the present object appears during the copy, the copy operation is interrupted to start a traversal of the sub-tree with the processing result reflected in the parenthesis structure. When a node having another kind is reached before the completion of the sub-tree traversal, the copy operation of the parenthesis structure of the pertinent portion is resumed.

For a group of such sub-trees, if an area in which the propagation attribute can be propagated is included in a plurality of sub-trees, a traversal different from the traversal associated with a generation of propagation information is achieved so as to propagate the propagation information by means of an attribute value vector.

In such a parenthesis structure, since the traversal can be effected only for a group of sub-trees of the present kind to develop the processing result, the processing of a traversal can be limited to a traversal on nodes. Furthermore, since each processing result is controlled according to the parenthesis structure, the interference of the respective processing results can be reflected. In addition, when the traversal is accomplished at a different timing, the necessary attribute can be propagated to attain the appropriate traversal result.

BRIEF DESCRIPTION OF THE DRAWINGS

The present invention will be apparent from the following detailed description taken in conjunction with the accompanying drawings in which:

FIGS. 6a–5d are explanatory diagram useful to explain a series of sequential data in an embodiment according to the present invention;

FIG. 8 is a flowchart of a processing to generate a series of initial sequential data in an initial tree traversal circuit of an alternative embodiment according to the present invention;

FIG. 15 is an explanatory diagram useful to explain a tree structure; and

DESCRIPTION OF THE PREFERRED EMBODIMENTS

Description will be given of an embodiment according to the present invention.

Figure 5A:
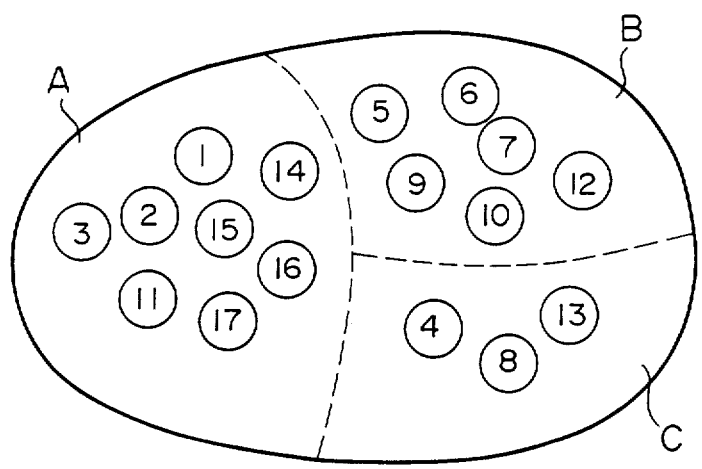
FIGS. 5a–5b are explanatory diagrams useful to explain nodes and sub-trees in an embodiment according to the present invention.
Figure 5B:
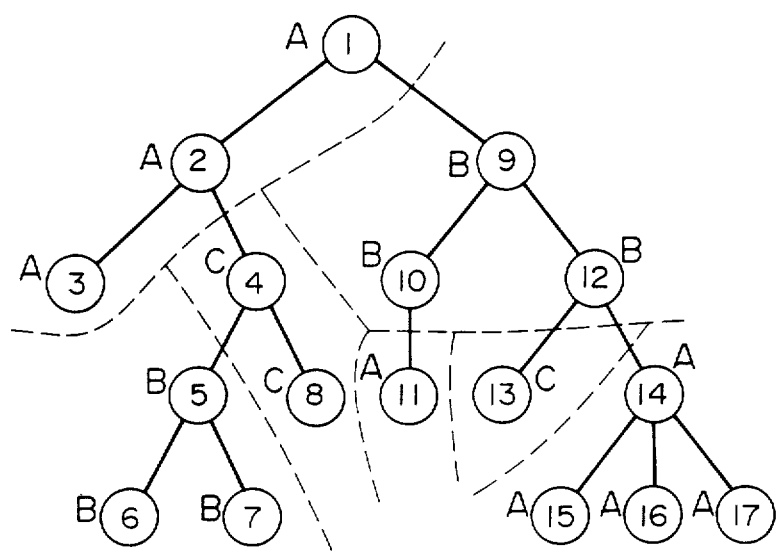

FIGS. 5a–5b are explanatory diagram useful to respectively explain nodes and sub-trees in an embodiment of the present invention, whereas FIGS. 6a–6d are explanatory diagrams useful to explain a series of sequential data in the embodiment of the present invention.

In a tree traversal method of the present embodiment, sets of nodes constituting a tree as an object of the traversal are beforehand classified depending on an evaluation order of each node. As a result of the classification, it is assumed that subsets separated by dotted lines corresponding to the classification of the diagram are assigned with kinds A–C, respectively. Each node retains a name of a kind to which the pertinent node belongs, and a tree of an object of a traversal is colored depending on the kind A, B, C, or D as shown in FIG. 5b.

Incidentally, sub-trees constituting the tree structure are defined as follows.

(i) A root of the entire tree or a node having a kind different from that of the parent thereof is a root of a sub-tree to which the node belongs.

(ii) When a kind of a child of a node belonging to a sub-tree matches with a kind of the parent thereof, the child belongs to the sub-tree.

(iii) A node for which a leaf or all children thereof is or are of a kind different from that of the node is a leaf of the sub-tree to which the node belongs.

Consequently, according to the definitions above, as shown in FIG. 5b, the areas separated by dotted lines indicate the sub-trees thus defined. In addition, each sub-tree is identified depending on a position of a root of the pertinent sub-tree.

Figures 6A, 6B, 6D:
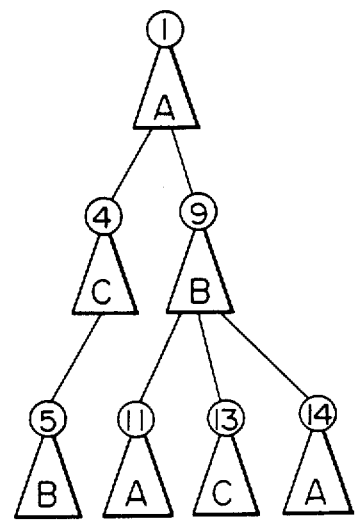

When the object tree is colored as described above, a tree traversal is first achieved so as to sequentially recognize each sub-tree, as shown in FIG. 6a, by a position of a node undergone the traversal, a kind of the node, and a mark indicating a positional relationship between the node and a boundary of an area to which the node belongs.

Depending on the recognition, a tree structure of FIG. 5b is developed into a series of sequential data in a configuration like that shown in FIG. 6b.

In this operation, at a node having a kind different from that of the parent thereof, the node is recognized as a root of a new sub-tree according to the preorder, and then a position of the node, a kind thereof, and data (start symbol data) keeping a start symbol are arranged at an end of a series of sequential data.

Furthermore, at a node, when the traversal stage is i (i>1), if the kind of the i-th child is different from that of the node, the kind and data (intermediate symbol data) keeping an intermediate symbol are arranged at an end of the series of sequential data.

Moreover, the intermediate symbol data last appeared in a sub-tree is deleted from the end, and for a root of the sub-tree, a kind and data (end symbol data) keeping an end symbol are arranged according to the postorder at the end of the series of sequential data.

Assuming that the series of sequential data thus generated is a tree including as units thereof sub-trees indicating the respective kinds A-C as shown in FIG. 6e, the tree can be expressed by a parenthesis structure of FIG. 6d. Consequently, the start symbol, the end symbol, and the intermediate symbol of the series of sequential data respectively correspond to a left parenthesis, a right parenthesis, and a separation of the parenthesis structure.

In addition, the series of sequential data is called a series of initial sequential data. An object series of sequential data is attained by sequentially achieving a search of a series of sequential data beginning from the younger kind according to the kind indicating the evaluation order. Incidentally, for the kind associated with the first search, the initial sequential data series is regarded as an original sequential data series, whereas for the kind associated with the second and subsequent searches the previous object sequential data series is regarded as an original sequential data series.

In a case where such an original sequential data series is searched to develop an object sequential data series, a sequential search is first accomplished for the series of original sequential data ranging from the top to the end thereof. If the kind of the respective data does not match with the pertinent kind, the data is arranged at the end of the series of object sequential data.

When start symbol data having a kind identical to the pertinent kind is reached during the search, a sub-tree traversal is initiated from a position of a node keeping the data. When a node with a kind different from the kind appears, the sub-tree traversal becomes inactive, or when the sub-tree traversal is completed, the search is resumed beginning from the next data.

When intermediate symbol data or end symbol data each having a kind identical to the pertinent kind is reached during the search, the sub-tree traversal temporarily set to be inactive because of a preceding appearance of a node having a kind different from the pertinent kind is reactivated; furthermore, the sub-tree traversal is made to be inactive due to an appearance of a node having a kind different from the pertinent kind, or after the sub-tree traversal is completed, the traversal is resumed beginning from the next data. Incidentally, if the pertinent sub-tree traversal is already finished at a point of the indication, the traversal is continued beginning from data immediately following the data.

As described above, in a process to generate an object sequential data series from an original sequential data series through the search of the sequential data of the pertinent kind, a traversal is started for a sub-tree having the indicated node as a root thereof, and if an attribute corresponding to a traversal stage is required for each node to be subjected to the tree traversal, an evaluation is carried out at the point so as to arrange the value at the end of the series of object sequential data.

For example, at a node, if the i-th child does not belong to the sub-tree, the traversal is made to be inactive in a state immediately before a traversal stage i so as to wait for an indication.

In this case, if the sequential data is intermediate or end symbol data having a kind identical to the pertinent kind, a reactivation is indicated and then the corresponding sub-tree traversal already inactivated is reactivated beginning from a traversal stage i of the node where the traversal is made to be inactive. Incidentally, when the corresponding sub-tree traversal is missing, namely, the sub-tree traversal is already finished, the state waiting for an indication is set again.

In a search of an original sequential data series, if the termination of processing of the end data of the original sequential data series means a completion of search of the original sequential data series associated with a kind and a completion of a sub-tree traversal and there exists the next kind, in order to attain sequential data of the next kind by assuming the object sequential data series so far to be an original sequential data series, a search of the original sequential data series is initiate beginning from the top thereof.

Furthermore, according to the tree traversal method of the present embodiment, in a case where a sub-tree traversal in process is made to be inactive because a kind of a node does not match with the pertinent kind, and since the mark of the sequential data is an intermediate symbol or an end symbol, a reactivation is indicated so as to resume the sub-tree traversal activated from start symbol data corresponding to the intermediate symbol data and the end symbol data at the point, a location to keep information (sub-tree traversal information) indicating a position for a reactivation of the sub-tree traversal such as the environment, a node, and a traversal stage necessary for the respective sub-tree traversal, namely, the sub-tree traversal information pointer is controlled in a stack structure. For a reactivation of a tree traversal, the sub-tree traversal information pointer is used as information to indicate a start point of the corresponding sub-tree traversal. Consequently, at an arrival of the new start symbol data, the sub-tree traversal information pointer used so far is pushed into the stack, whereas at an arrival of the end symbol data, the pointer is popped from the stack.

Figure 1:
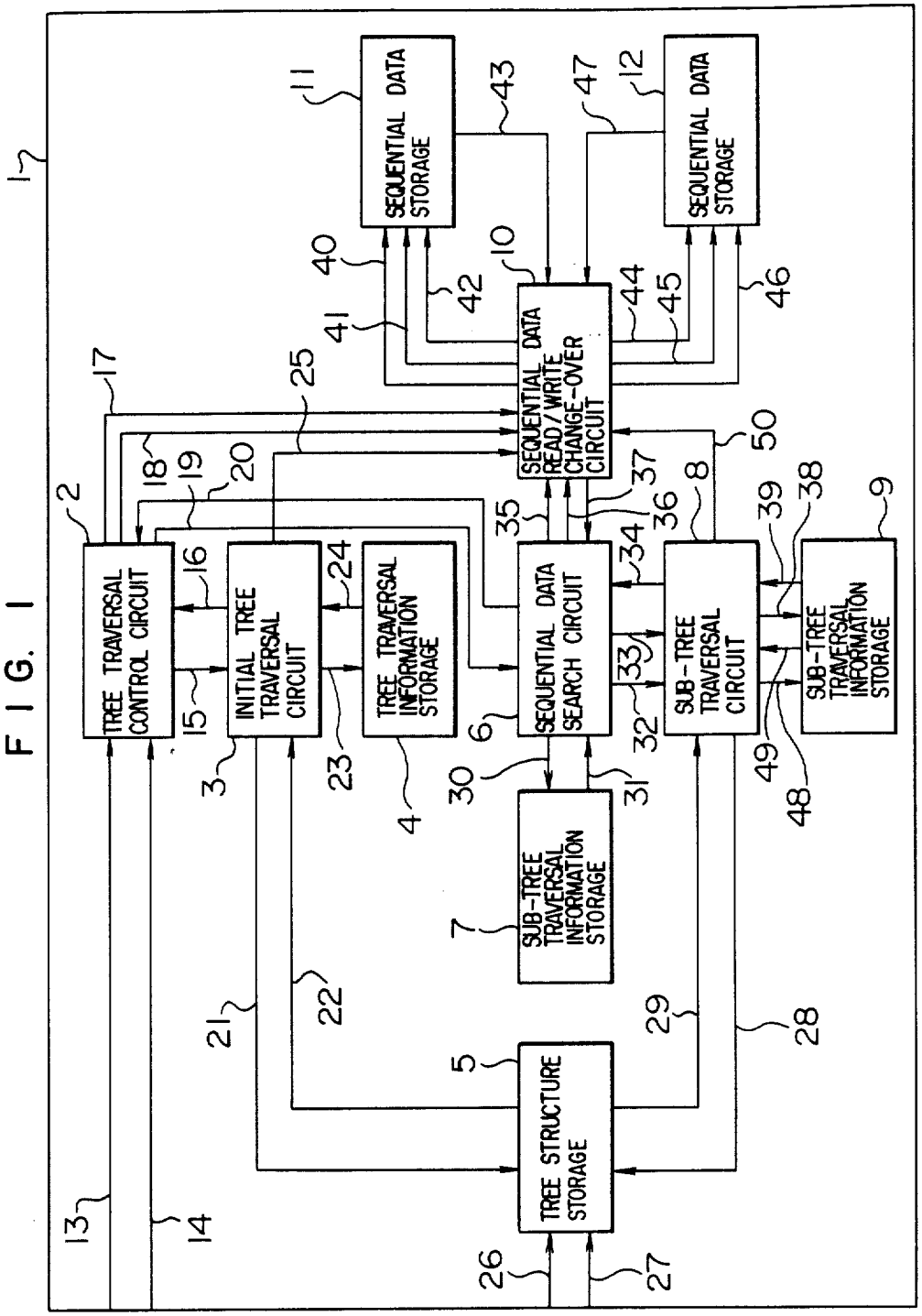
FIG. 1 is a configuration diagram of a tree traversal apparatus in an embodiment according to the present invention.

FIG. 1 is a configuration diagram of a tree traversal apparatus in an embodiment according to the present invention.

In this configuration, a tree traversal apparatus 1 of the embodiment includes a tree traversal controller 2, an initial tree traversal circuit 3, a tree traversal information storage 4, a tree structure storage 5, a sequential data search circuit 6, a sub-tree traversal control information storage 7, a sub-tree traversal circuit 8, a sub-tree traversal information storage 9, a sequential data read/write change-over circuit 10, and sequential data storage 11-12.

The tree structure storage 5 beforehand accumulates tree structure data such as tree structure information 26 and attribute information 27 of each node so as to output node information items 22 and 29 for a reference of structure information such as locations of the elder child and a younger brother of a node, a reference of attribute information of each traversal stage of a node, or tree structure accesses 21 and 28 such as an update request.

On receiving a tree traversal start signal 13, the tree traversal control circuit 2 outputs an initial signal 17 to the sequential data read/write change-over circuit 10.

Furthermore, on receiving a kind information 14, if the input is effected after an output of the start signal 15 to the initial tree traversal circuit 3 and after an output of a start signal to the sequential data search circuit 6, the tree traversal control circuit 2 waits for an input of an end signal 16 send from the initial tree traversal circuit 3 and an input of an end signal transmitted from the sequential data search circuit 6. When the end signal 16 or 20 is inputted, a change-over signal 18 is delivered to the sequential data read/write change-over circuit; furthermore, the start signal 19 to start a search associated with the pertinent kind is fed to the sequential data search circuit 6.

When the initial signal 17 is inputted, the sequential data read/write change-over circuit 10, in order to allocate the sequential data storage 11 as a location to accumulate a series of object sequential data, connects channels of sequential data 25 and 35 to be inputted to a channel of sequential data 41 as write data to be written in the sequential data storage 11 and connects a channel of sequential data 37 outputted from the sequential data read/write change-over circuit 10 to a channel of sequential data 47 read from the sequential data storage 12, thereafter a reset signal 40 is delivered to the sequential data storage 11. After this point, each time sequential data 25 is inputted, sequential data 41 to be written in the sequential data storage 11 is outputted.

When the change-over signal 18 is inputted and if the channels of sequential data 25 and 35 to be inputted are connected to the channel of sequential data 41 to be written in the sequential data storage 11, the sequential data read/write change-over circuit 10 changes over the channels of the input data 25 and 35 to the channel of the sequential data 45 to be written in the sequential data storage 12 for the connection. If the channels of the input data 25 and 35 are connected to the channel of the sequential data 45 to be written in the sequential data storage 12, the channels of the input data 25 and 35 are changed over for the connection to the channel of the sequential data 41 to be written in the sequential data storage 11.

Moreover, in a case where the channels of the read signal 36 and the sequential data 37 to be outputted to the sequential data search circuit 6 are connected to a channel of the sequential data 47 read from the sequential data storage 12, the channels of the read signal 36 and the sequential data 37 to be outputted to the sequential data search circuit 6 are changed over for connection to the channels of a read signal 42 and sequential data 43, and then a reset signal 44 is delivered to the sequential data storage 11. Furthermore, contrarily, in a case where the channels of the read signal 36 and the sequential data 37 are connected to the channels of a read signal 42 and sequential data 43, the channels of the read signal 36 and the sequential data 37 are changed over for connection to the channels of the read signal 46 and the sequential data 47, and then the reset signal 44 is fed to the sequential data storage 12.

After this point, each time the sequential data 35 is inputted, the sequential data read/write change-over circuit 10 outputs the sequential data 42 or 46 to be written in the sequential data storage 11 or 12 to which the channels are connected. Furthermore, each time the read signal 36 is inputted, the read signal 42 or 46 is outputted to the sequential data storage 11 or 12 to which the channels are connected and then the sequential data read/write change-over circuit 10 receives as an input thereto the sequential data 43 or 47 respectively read from the sequential data storage 11 or 12 so as to produce output data 37.

The sequential data storages 11-12 each includes a storage section in which inputted data are sequentially arranged and a pointer indicating a location of data last arranged. When the sequential data 41 and 45 are inputted as write data, the current pointer is incremented by a data item so as to store the write data 41 and 45 in the location indicated by the resultant content of the pointer. When the read signals 42 and 46 are inputted, the sequential data 43 and 47 in the location indicated by the current pointer are outputted as read data and then the pointer is incremented by a data item.

These data are data comprising three fields, namely, a node field, a kind field, and a mark field or attribute data. The node field keeps a location of the node data, the kind field contains a kind of the node, and the mark field retains a start symbol, an intermediate symbol, or an end symbol of the data. Consequently, the data constituted from the node, kind, and mark fields represent information concerning a sub-tree of a kind which has not been developed, whereas the attribute data indicates attribute information itself of a node already developed.

Incidentally, each circuit in the tree traversal apparatus 1 of FIG. 1 can be configured by means of a processor such as a microcomputer or a storage device. Moreover, the tree traversal apparatus 1 itself may be configured by means of a processor and a common memory so as to implement the functions of the respective circuits by use of programs in the processor.

Figure 2:
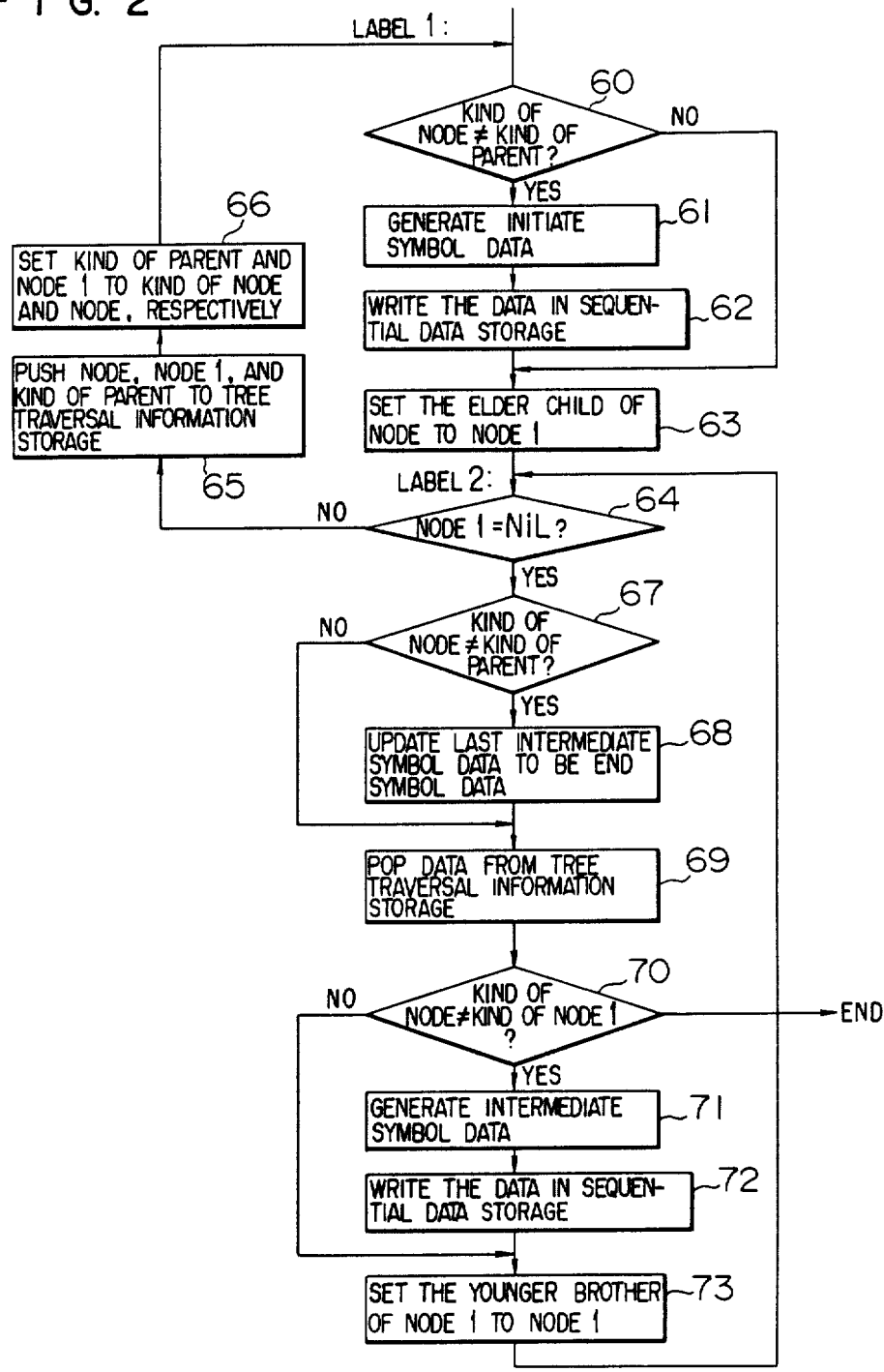
FIG. 2 is a flowchart of an operation to generate a series of initial data in an initial tree traversal circuit according to the embodiment of the present invention.

FIG. 2 is a flowchart of an operation to generate a series of initial sequential data in the initial tree traversal circuit 3 in the embodiment according to the present invention. Incidentally, NODE indicates a location of the current node in the traversal, whereas NODE1 represents a location of a child of the current node.

As shown in FIG. 1, the first tree traversal circuit 3 effects the push operation and the pop operation for the tree traversal information storage 4, which inputs and accumulates saved information 23 at the end of the stack structure in response to the push operation of the initial tree traversal circuit 3 and which fetches information at the end of the stack structure and outputs attained information as return information 24 in response to the pop operation of the initial tree traversal circuit 3.

As shown in FIG. 2, when the tree traversal control circuit 2 first outputs the start signal 15, the initial tree traversal circuit 3 inputs the start signal 15 so as to initiate a traversal beginning from a root of the tree structure stored in the tree structure storage 5.

When NODE indicating a location of the current node in this tree traversal is a root or when the kind of the NODE is different from that of the parent thereof, the node is assumed to be a root of the sub-tree (step 60), and start symbol data is generated for the node (step 61) so as to be written in the object sequential data storage 11 via the sequential data read/write change-over circuit 10 (step 62).

Next, in order to achieve a traversal of the elder child of the descendant beginning from the elder child of the NODE, the current NODE, NODE1, and the kind of the parent are pushed into the tree traversal information storage 4 (step 65), information about the child is set again (step 66), and then control returns to label 1 so as to determine whether or not the kind of the NODE is equal to that of the parent (step 60).

At the root of the sub-tree, if the younger brother is missing (step 67) and if intermediate symbol data exists at the end of the sequential data series, the intermediate symbol data is deleted; thereafter, end symbol data is generated and arranged at the end of the sequential data series (step 68).

Furthermore, when control returns from the traversal of the children, the tree traversal information storage 4 effects a pop operation so as to restore the current information (step 69). If there does not exist any information to be popped, the processing is terminated.

When the kind of the child is judged to be different from the pertinent kind (step 70), intermediate signal data is generated for the node (step 71) and then is written in the object sequential data storage 11 via the sequential data read/write changeover circuit 10 (step 72).

When intermediate symbol data is completely written as described above, the younger brother of the NODE1 is set to the NODE1 (step 73) and then control returns to label 2 so as to determine whether or not the content of the NODE 1 is nil (step 64).

Figure 3:
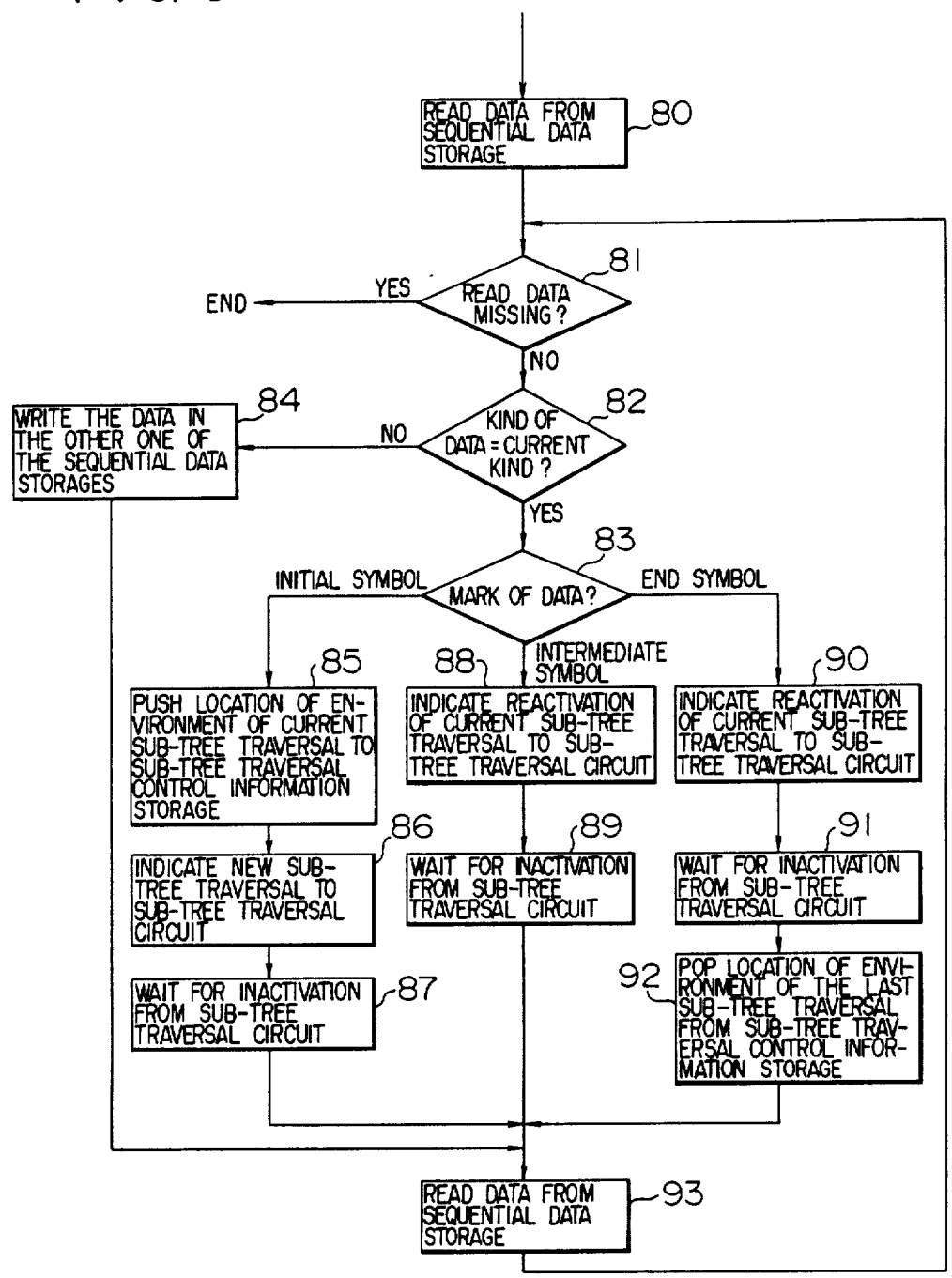
FIG. 3 is a flowchart of an operation to develop a series of original sequential data into a series of object sequential data in a sequential data search circuit of an embodiment of the present invention.

FIG. 3 is a flowchart of processing to develop an original sequential data series into an object sequential data series in the sequential data search circuit of the embodiment according to the present invention. Incidentally, the sequential data storages 11 and 12 respectively accumulate the original sequential data series and the object sequential data series, and description will not be given here of the operation through the sequential data read/write change-over circuit 10.

As shown in FIG. 1, the sequential data search circuit 6 achieves a push operation for the sub-tree traversal control information storage 7, which receives as an input thereto saved information 30. The saved information 30 is stored at the end of the stack structure and is thereafter fetched in response to a pop operation of the sequential data search circuit 6 so as to be outputted as return information 31.

As shown in FIG. 3, on receiving the start signal 19 from the tree traversal control circuit 2, the sequential data search circuit 6 first reads data for a search of the original sequential data series beginning from the top thereof in the sequential data storage 11 (steps 80 and 93).

If the data to be read is null data (step 81), an end signal 20 is outputted to the tree traversal control circuit 2 and then control enters a state waiting for a start signal 19 from the tree traversal control circuit 2.

If there exists data to be read (step 81), it is determined whether or not the value of the kind field of the data is equal to the present kind (step 82). If the kinds are different from each other, the data is written in the sequential data storage 12 (step 84).

When the value of the kind field of the data matches with the current kind, the mark of the data is then checked (step 83).

If the mark field contains a start symbol, a value (sub-tree traversal information pointer) indicating a location in the sub-tree traversal information storage 9 is selected from information necessary for the traversal of the present sub-tree and is pushed as saved information 30 into the sub-tree traversal control information storage 7 (step 85), and then a sub-tree traversal start or activate signal 32 associated with a location of a node in the node field is sent to the sub-tree traversal circuit 8 to indicate the start of a new sub-tree traversal (step 86); thereafter, control waits for a sub-tree traversal stop or inactivate signal 34 from the sub-tree traversal circuit 8 (step 87). Incidentally, the sub-tree traversal stop signal 34 includes a sub-tree traversal information pointer for the new sub-tree traversal and is temporarily kept in the sequential data search circuit 6 until the location of the environment of the present sub-tree traversal is pushed into the sub-tree traversal control information storage 7. After this point, when the sub-tree traversal stop or inactivate signal 34 is inputted, data is read again from the sequential data storage 11 (step 93).

Furthermore, if the mark field contains an intermediate symbol, a sub-tree traversal reactivate signal 33 including the current sub-tree traversal information pointer 30 is sent to the sub-tree traversal circuit 8 to indicate a reactivation of the sub-tree traversal (step 88), and then control waits for a sub-tree traversal inactivate signal 34 from the sub-tree traversal circuit (step 89). When the sub-tree traversal inactivate signal 34 is thereafter inputted, data is read again from the sequential data storage 11 (step 93).

Moreover, when the content of the mark field is an end symbol, like in the case of the intermediate symbol (steps 88 and 89), a reactivation of the current sub-tree traversal is indicated (step 90) and control waits for the sub-tree traversal inactivate signal 34 from the sub-tree traversal circuit 8 (step 91); thereafter, the latest sub-tree traversal information pointer 31 is popped from the sub-tree traversal control information accumulate circuit 7 (step 92) and then data is read again from the sequential data storage 11 (step 93).

Figure 4:
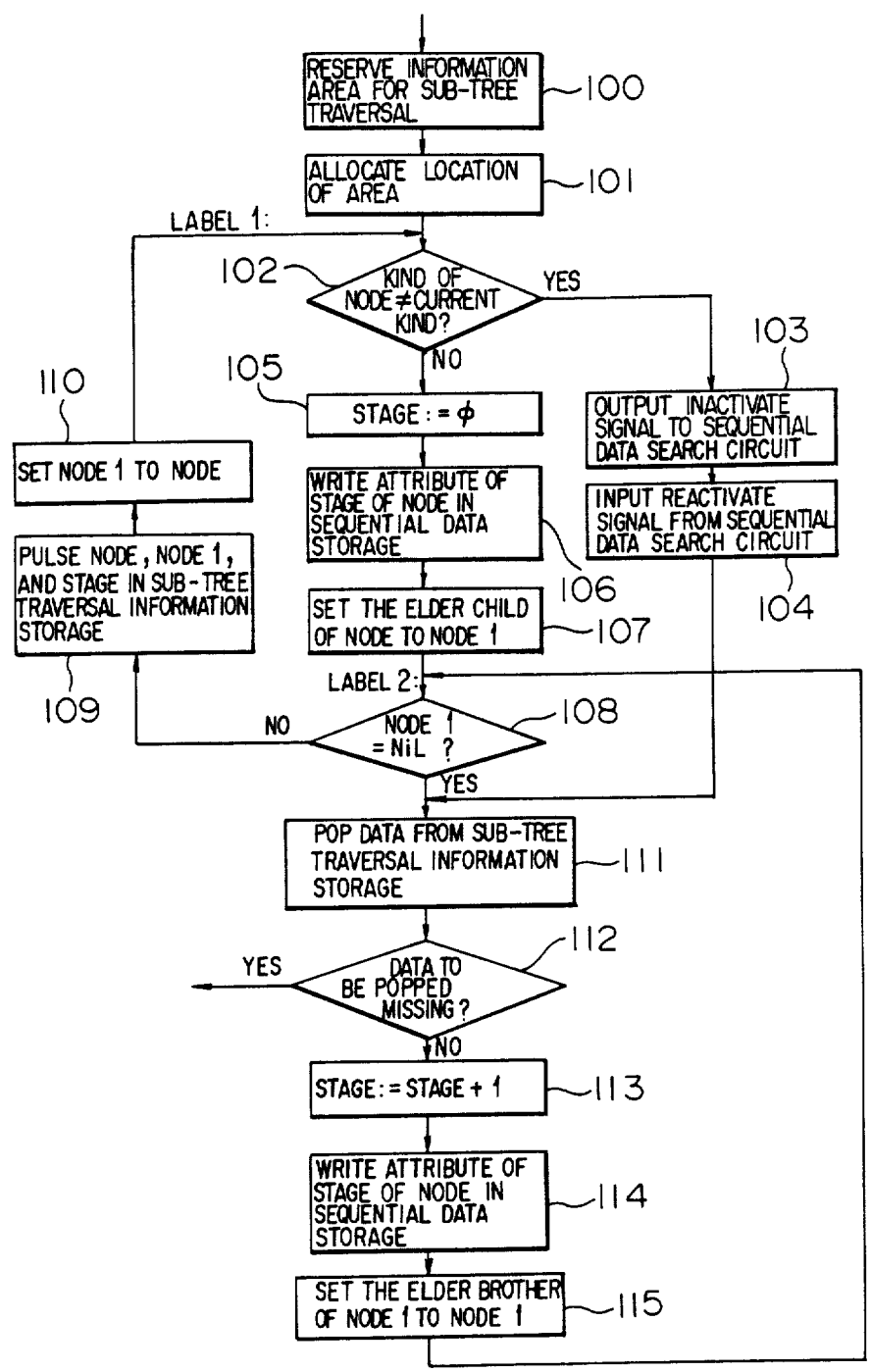
FIG. 4 is a flowchart of an operation in a sub-tree to develop a tree structure into a series of object sequential data in a sub-tree traversal circuit of an embodiment according to the present invention.

FIG. 4 is a flowchart of processing to develop a tree structure into an object sequential data series in the sub-tree traversal circuit of the embodiment according to the present invention. Incidentally, NODE indicates a location of the current node in the traversal, NODE1 designates a location of a child of the present node, and STAGE denotes a traversal stage of the NODE.

Like in the case of FIG. 1, according to a generate operation of the sub-tree traversal circuit 8, the sub-tree traversal information storage 9 reserves an area corresponding to a new sub-tree when a generate signal 48 is received as an input thereto and then outputs the location (sub-tree traversal information pointer 49) to the sub-tree traversal circuit 8. Thereafter, in response to a push operation of the sub-tree traversal circuit 9, saved information 38 is inputted and is then accumulated at the end of the stack structure in an area specified by the sub-tree traversal information pointer included in the saved information. In response to a pop operation of the sub-tree traversal, similarly, information at the end of the stack structure in an area specified is fetched and is outputted as return information 39.

As shown in FIG. 4, on receiving as an input thereto a start signal 32 including a location of a node from the sequential data search circuit, the sub-tree traversal circuit 8 effects a traversal of a tree structure in the tree structure storage 5 with the node set as the root thereof. In this operation, the sub-tree traversal circuit 8 outputs a generation signal 48 to the sub-tree traversal information storage 9 so as to receive the sub-tree traversal information pointer 49 (steps 100 and 101).

When the kind of the NODE is different from the pertinent kind (step 102), a sub-tree traversal inactivate signal 34 including the sub-tree traversal information pointer is delivered to the sequential data search circuit 6 and the operation is inactivated (step 103). On receiving the sub-tree traversal reactivate signal 33 from the sequential data search circuit 6, the sub-tree traversal information pointer associated with the sub-tree traversal reactivate signal 33 is set as a pointer to indicate the current area in the sub-tree traversal information storage 9, and then the operation is reactivated (step 104).

When the kind of the NODE matches with the pertinent kind (step 102), an attribute of the NODE for STAGE=0 is written as sequential data 50 in the sequential data storage 12 (steps 105 and 106). Furthermore, the elder child of the NODE is set to the NODE1 (step 107).

When the NODE1 is other than nil (step 108), in order to effect a traversal of the elder children of the descendant beginning from the elder child of the NODE, the current NODE, NODE1, and STAGE are pushed into the current area of the sub-tree traversal information storage 9 (step 109), information about the child is set again (step 110), and control is returned to the label 1 so as to determine whether or not the kind of the NODE matches with the present kind (step 102).

When the NODE is nil (step 108), the pop operation is achieved on the current area of the sub-tree traversal information storage 9 at a point where control returns from the operation on the child, thereby restoring present information (step 111).

In this case, if data to be popped is missing (step 112), the traversal of this sub-tree is completed, the area indicated by the sub-tree traversal information pointer is abandoned, a sub-tree traversal inactivate signal 34 is outputted to the sequential data search circuit 6, and then control waits for a sub-tree traversal activate signal 32 or a sub-tree traversal reactivate signal 33.

If restore information is present (step 112), the STAGE undergoes a count-up operation (step 113), sequential data 50 indicating the attribute of the NODE at the STAGE is written in the sequential data storage 12 (step 114), the younger brother of the NODE1 is set to the NODE1 for the traversal of the younger brother (step 115), and then control returns to the label 2 to determine whether or not the NODE1 is nil (step 108). Incidentally, in a case where an area indicated by the sub-tree traversal information pointer associated with the sub-tree traversal reactivate signal 33 has already been abandoned, the sub-tree traversal inactivate signal 34 is outputted without executing the processing above, and then control waits for a sub-tree traversal activate signal 32 or a sub-tree traversal reactivate signal 33.

According to the embodiment described above, in a tree traversal to process data in a tree structure, nodes can be processed in an order of the traversal of the nodes, and when a plurality of traversals are necessary, the traversal is achieved only in the neighborhood of the object nodes for the respective traversal, which enables to improve the processing efficiency.

Also in a case where even a plurality of traversals cannot cope with an object situation to be processed because information necessary for processing each node cannot be reattained in a batch, the method according to the present invention enables to attain a node processing result similar to the result obtained when the entire tree is processed by a traversal operation.

Next, an alternative embodiment of the present invention will be described with reference to the drawings.

FIGS. 12, 13, 14a, and 14b are explanatory diagrams useful to explain nodes and sub-trees in the alternative embodiment according to the present invention; whereas FIGS. 11a–11d are explanatory diagrams useful to explain a series of sequential data in the alternative embodiment according to the present invention.

Figure 14A:
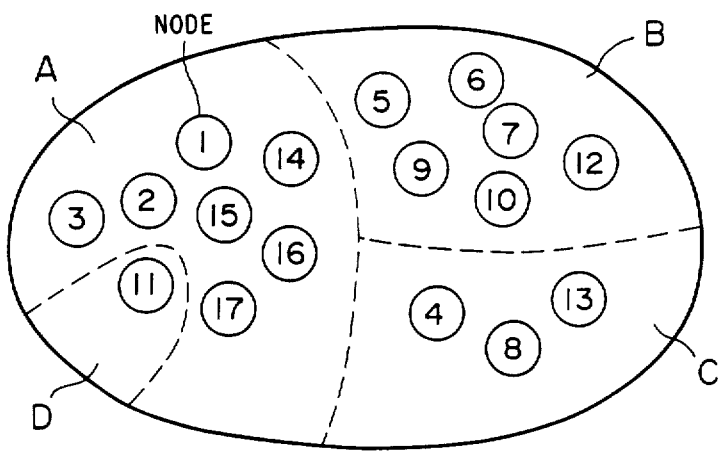

In the tree traversal method of this embodiment, as shown in FIG. 14a, a set of nodes 1–17 constituting a tree as an object of the traversal is beforehand classified depending on the evaluation order of the respective nodes 1–17 and subsets separated by dotted lines are assigned with the kinds A–D of the nodes. Each node retains a name of the kind to which the node belongs, and a tree as an object of the traversal is colored depending on the kinds A–D as shown in FIG. 4b.

Incidentally, the sub-trees constituting a tree structure are defined as follows.
(i) A root of an entire tree or a node with a kind different from that of the parent thereof is a root of the sub-tree to which the node belongs.
(ii) When the kind of a child of a node belonging to a sub-tree matches with the kind of the parent thereof, the child belongs to the sub-tree.
(iii) A node with a kind different from the kinds of leaves or all children thereof is a leaf of a sub-tree to which the node belongs.

Figure 14B:
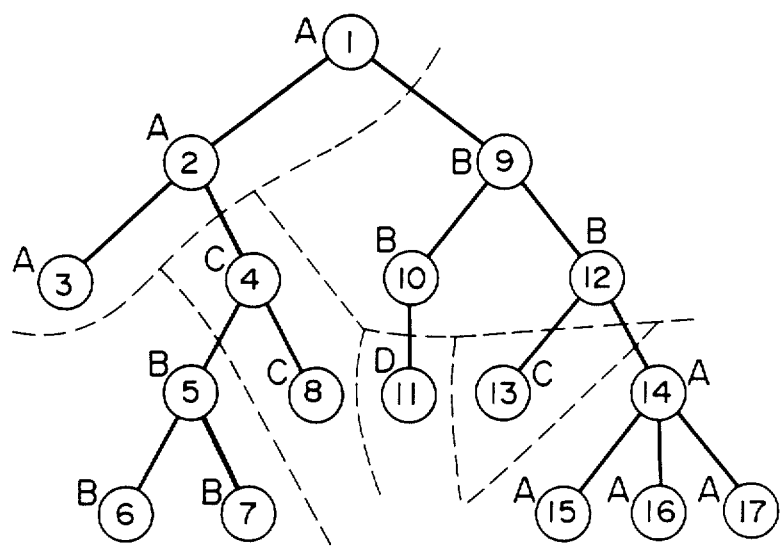
Figure 16A:
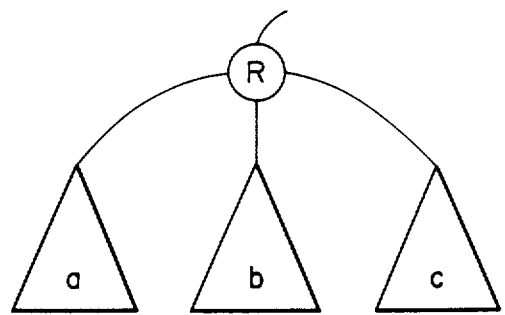
FIGS. 16a–16b are explanatory diagrams useful to explain operations for data in the tree structure.
Figure 16B:
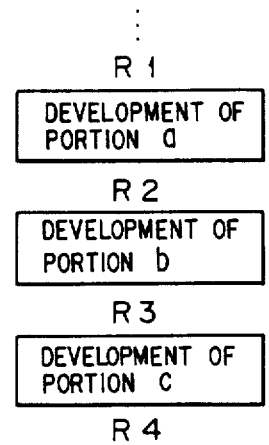

Consequently, according to the definitions above, as shown in FIG. 14b, the areas separated by the dotted lines represent sub-trees for the respective kinds. Furthermore, each sub-tree is identified by a location of a root of the sub-tree.

Moreover, according to the tree traversal method of this embodiment, in a case where at an evaluation of a node attribute based on the kind, if information possessed by the ancestor of the node, namely, propagation information is required to be referenced, the propagation information is readily propagated for the reference.

Propagation information is propagated from a node where the value thereof is defined to a node of a descendant where the value may possibly be referenced. For example, in a case where there does not exist any possibility that propagation information is referenced in a descendant of a node y which is a child of a node x, or another value is propagated as propagation information at the node y, the node x does not transfer the propagation information to the node y. In this case, the node y is called a separation point of propagation information.

As described above, an area where propagation information can be propagated, namely, a propagation enable area is defined as a sub-tree as follows.
(i) A node where propagation information is defined is a root of the sub-tree.
(ii) A node having the parent which belongs to the sub-tree and not being a separation point belongs to the sub-tree.
(iii) A node which belongs to the sub-tree and of which the leaves or all children are separation points is a leaf of the sub-tree.

Figure 13:
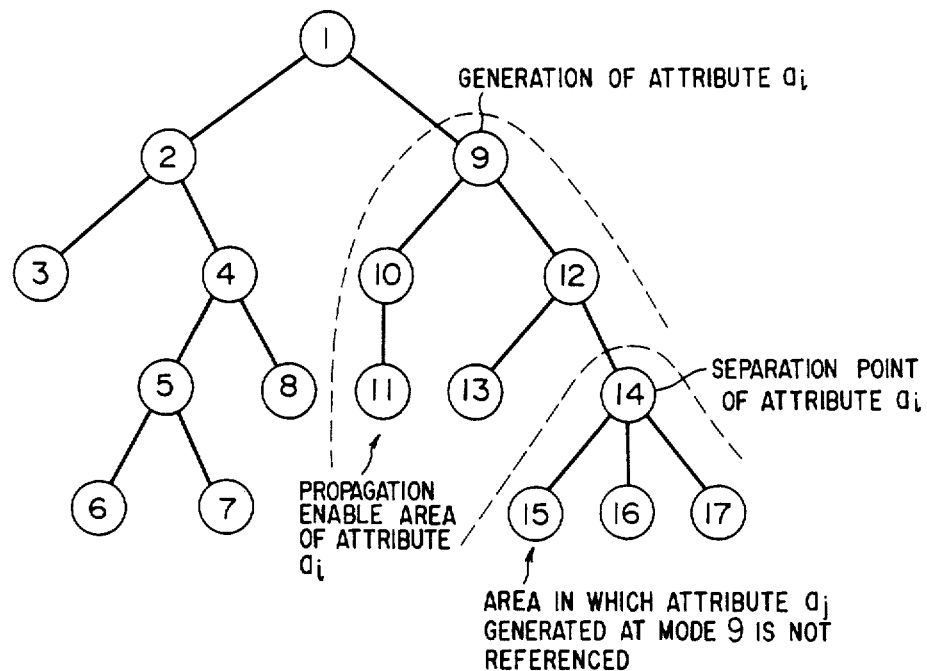

According to the definitions above, for example, as shown in FIG. 13, a propagation enable area of an attribute $a_i$ ranges from a node 9 generating the attribute $a_i$ and a position immediately before a node 14 which a separation point of the attribute $a_i$. Consequently, the sub-tree including the nodes 9–13 is the propagation enable area of the attribute $a_i$, whereas the sub-tree including the nodes 14-17 is an area in which the attribute $a_i$ is not referenced.

Furthermore, a propagation enable area is in general (i) included in a sub-tree or (ii) included in a plurality of sub-trees.

In the case (i), only at a traversal of the sub-tree, pertinent propagation information is generated and referenced.

In the case (ii), in a traversal other than a traversal associated with a generation of propagation, pertinent propagation information is required to be propagated. Namely, a traversal associated with a generation of propagation must be effected prior to a traversal associated with a reference of the propagation information, and the evaluation order of each sub-tree according to the tree traversal method of this embodiment is assumed to satisfy the condition.

Moreover, propagation information is classified into several kinds and is propagated according to the assigned kinds.

That is, generation and reference of propagation information are effected by specifying a kind with the identical name at the respective nodes. Consequently, in a propagation enable area of a certain information item, the value of the propagation information item is unique and the propagation information item is propagated by means of an attribute value vector keeping values of propagation information for each kind.

Figure 12:
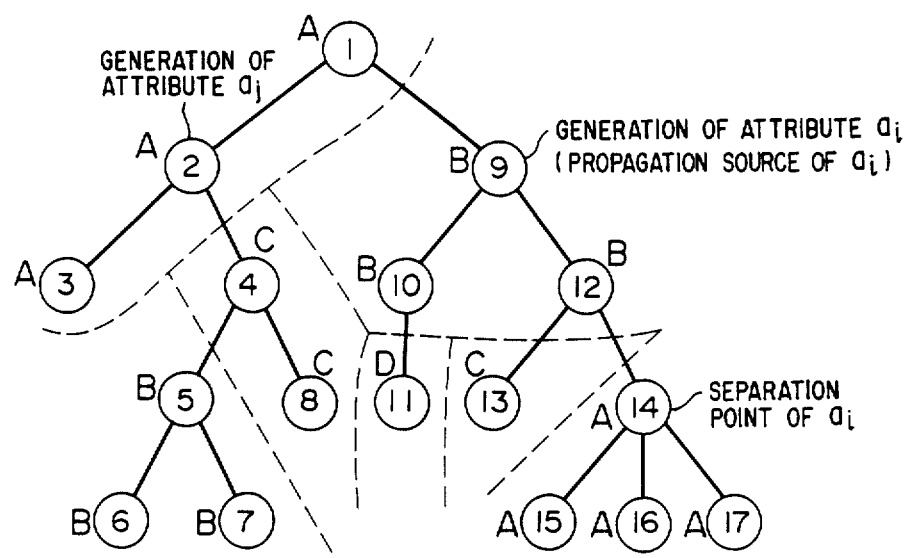
FIGS. 12, 13, 14a, and 14b are explanatory diagrams useful to explain nodes and sub-trees in the alternative embodiment according to the present invention.

For example, group nodes constituting a tree structure are colored according to the kinds A-D indicating the attribute evaluation order as shown in FIG. 12 such that the sub-trees are configured depending on the colors. Furthermore, independent of the sub-trees according to the kinds, there are identified such sub-trees based on attribute propagation areas as a sub-tree including a node 9 of the propagation source of the attribute $a_i$ and the nodes 10-13 of the propgation enable area, a sub-tree comprising the node 2 of the propagation source of the attribute $a_i$, and a sub-tree including the node 14 of the separation point of the attribute $a_i$ and the nodes 15-17 of an area in which the attribute $a_i$ is not referenced.

After the color operation by the kinds and the classification based on the kinds of attributes to be propagated, a sub-tree is first recognized while effecting a traversal of a tree as an object. In this recognition, the sub-tree is recognized by the location of a node undergone a sequential traversal, the kind of the node, and a mark (a start symbol, an intermediate symbol, or an end symbol) indicating a positional relationship between the node and the boundary to which the node belongs. Moreover, when a node generating a propagation information item is reached in the preorder, as shown in FIG. 5b, a location to which a value of the attribute to be propagated, namely, a unit of a store location of the attribute vector areas $a_1$, $a_2$, $a_1'$, and $a_2'$ is reserved, and then an attribute value vector pointer indicating the location is stored in the node.

Figures 11C, 11D:
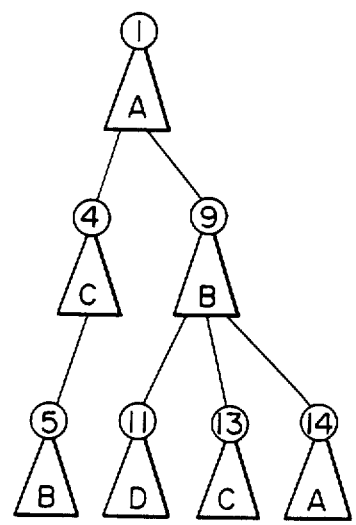
FIGS. 11a–11d are explanatory diagrams useful to explain a series of sequential data in the alternative embodiment according to the present invention.
Figures 11A, 11B:
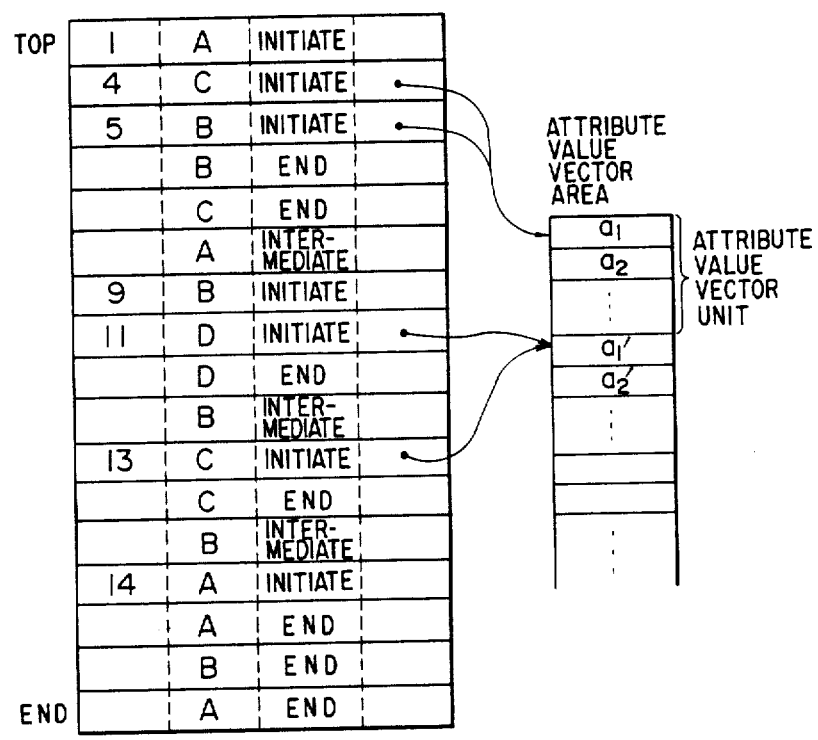

Based on this recognition, according to the tree structure of FIG. 12, the sequential data configured as shown in FIG. 11a is developed into a sequential data series of FIG. 11b.

As described above, when a node of which the kind is different from that of the parent thereof is reached in the preorder, the node is recognized as a root of the new sub-tree, the location of the node, the kind thereof, and data (start symbol data) keeping an attribute value vector pointer reserved by the ancestor nearest to the node are arranged at the end of the sequential data series.

In addition, at a node, if the traversal stage is i ($i \geq 1$) and if the kind of the first child is different from that of the node, the kind and data (intermediate symbol data) keeping an intermediate symbol are arranged at the end of the sequential data.

Moreover, intermediate symbol data last appearing in a sub-tree is deleted therefrom, and when a root of the sub-tree is reached in the postorder, the kind and data (end symbol data) keeping the end symbol are arranged at the end of the sequential data series.

The sequential data series thus created can be, assuming that the tree of FIG. 12 includes as units thereof the sub-trees associated with the respective kinds A-D as shown in FIG. 11c, represented by a parenthesis structure as shown in FIG. 11d. Consequently, the start symbol, the end symbol, and the intermediate symbol in the sequential data series of FIG. 11b respectively correspond to the left parenthesis, the right parenthesis, and the separation in this parenthesis structure.

Furthermore, this sequential data series is called an original sequential data series. An object sequential data series is attained by sequentially effecting a search of the sequential data series according to the kind indicating the evaluation order of the attribute beginning from the youngest kind as many time as there are the kinds. Incidentally, for the kind associated with the first search, the initial sequential data series is regarded as the original sequential data series; whereas for the kinds associated with the second and subsequent searches, the previous object sequential data series is regarded as the original sequential data series.

In a case where the original sequential data series is searched to develop an object sequential data series, while effecting a sequential search of the original sequential data series from the top to the end thereof, if the kind of each data does not match with the pertinent kind as the object, the data is arranged at the end of the object sequential data series.

During the search, if start symbol data having a kind matching with the pertinent kind, and start indicating data including an attribute vector pointer in the start symbol data is generated, a sub-tree traversal is initiated beginning from the location of the node kept in the data. When the sub-tree traversal is inactivated or terminated, the search is resumed beginning from the subsequent data.

In a case where intermediate or end symbol data with a kind matching with the pertinent kind is reached during the search, the system resumes the sub-tree traversal which has been inactivated because of an appearance of a node with a kind different from the pertinent kind before the arrival of the intermediate or end symbol data. Moreover, when a node having a kind different from the pertinent kind appears in the resumed sub-tree traversal, the search is restarted beginning from the subsequent data when the sub-tree traversal is inactivated or terminated. Incidentally, if the sub-tree traversal is already ended at the indicated point, the search is continued from the next data.

As described above, in a process in which the sequential data of the pertinent kind is searched so as to attain an object sequential data series from an original sequential data series, a sub-tree traversal is commenced with the indicated node set as a root.

In this operation, the attribute value vector pointer in the start indication data indicating an initiation of the sub-tree traversal is retained as a location of the current attribute value vector. Moreover, in the sub-tree traversal, a stack structure is created to appropriately propagate the present attribute vector pointer.

During this traversal, when a node generating a propagation attribute is reached in the preorder, the present attribute vector pointer value is pushed into the stack before an initiation of processing in the node, and then a vector value reflecting the propagation attribute evaluation result is stored in the storage location by regarding the attribute value vector storage location already assigned to the node as the current attribute value vector pointer.

In addition, when the node is reached in the inorder and in the postorder and the processing in the node is completed, a pointer value popped from the stack is assumed to be the current attribute value vector pointer so as to return the processing to the parent.

As described above, for each node to be subjected to the tree traversal, if necessary, an attribute corresponding to the traversal stage is evaluated at the point so as to arrange the value at the end of the object sequential data series.

For example, at a node, if the i-th child does not belong to the sub-tree, the traversal is inactivated in a state immediately before the traversal stage i and control enters a state waiting for an indication.

In this case, if the sequential data is intermediate or end symbol data with a kind matching with the pertinent kind, the inactivated sub-tree traversal is reactivated beginning from the traversal stage of the node where the traversal has been inactivated.

Incidentally, if the associated sub-tree traversal does not exist, namely, the traversal of the sub-tree has already been completed, control again enters a state waiting for an indication.

In a traversal of such an original sequential data, the completion of processing of the end data of the original sequential data means the completion of the search of the original sequential data series for a kind and the completion of the sub-tree traversal, and if there exists another kind, the object sequential data series in the search above is regarded as an original sequential data series and the search is initiated on the original sequential data series beginning from the top thereof so as to attain the sequential data of the kind.

Furthermore, according to the tree traversal method of this embodiment, in a case where the sub-tree traversal is inactivated because a kind of a node does not match with the pertinent kind; moreover, since the mark of the sequential data contains an intermediate or end symbol, in response to a reactivation indication, the sub-tree traversal initiated from the start symbol data corresponding to the intermediate symbol data and the end symbol data at the point is to be resumed, a location keeping information (sub-tree traversal information) indicating a position to reactivate the sub-tree traversal including the environment, the node, and the traversal stage necessary for each sub-tree traversal, namely, the sub-tree traversal information pointer is controlled in a stack structure.

This sub-tree traversal information pointer is used, when a resumption of the tree traversal is indicated, as information indicating the initiating position of the associated sub-tree traversal. Consequently, the sub-tree traversal information pointer used so far is pushed into the stack and is thereafter popped therefrom when the end symbol data is reached.

Figure 7:
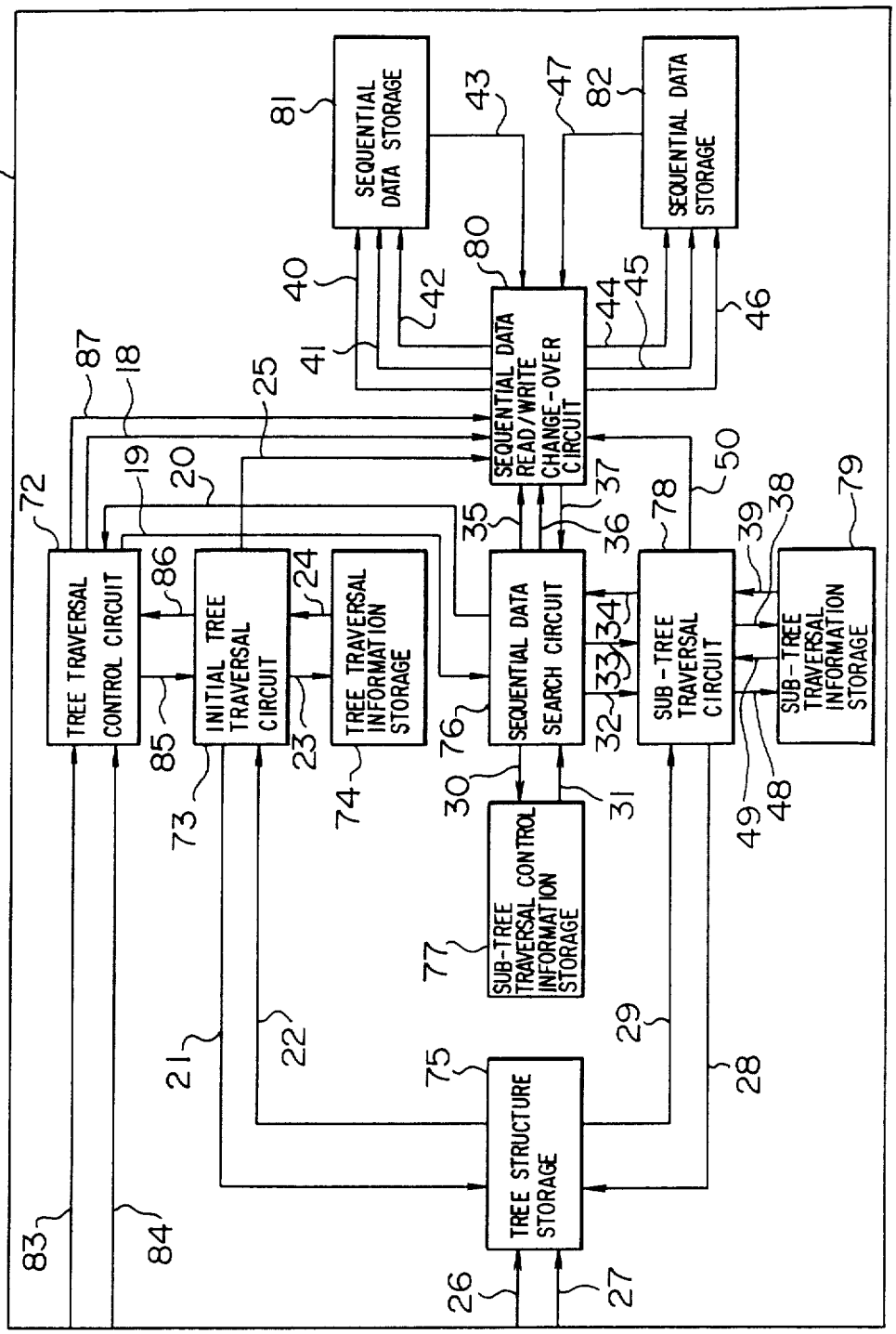
FIG. 7 is a schematic diagram illustrating the configuration of a tree traversal apparatus of the embodiment according to the present invention.

FIG. 7 is a configuration diagram of the tree traversal apparatus of an alternative embodiment according to the present invention.

A tree traversal apparatus 71 of this embodiment includes a tree traversal control circuit 72, an initial tree traversal circuit 73, a tree traversal information storage 74, a tree structure storage 75, a sequential data search circuit 76, a sub-tree traversal control information storage 77, a sub-tree traversal circuit 78, a sub-tree traversal information storage 79, a sequential data read/write change-over circuit 80, and sequential data storages 81–82.

The tree structure storage 75 beforehand accumulates tree structure data such as tree structure information 26 and attribute information 27 of each node and outputs pertinent node information items 22 and 29 for the reference to the structure information such as locations of the elder child and the younger brother of a node or for the tree structure accesses 21 and 28 such as an update request.

The tree traversal control circuit 72, on receiving the tree traversal initiate signal 83, outputs an initial signal 87 to the sequential data read/write change-over circuit 80 and then delivers an initiate signal 85 to the initial tree traversal circuit 73.

The tree traversal control circuit 72 waits, on receiving kind information 84, if the input takes place after the output of the initiate signal 85 to the initial tree traversal circuit 73 and after the output of the initial signal 19 to the sequential data search circuit 76, for an input of a terminate signal 86 sent from the initial tree traversal circuit 73 and the terminal signal 20 delivered from the sequential data search circuit 76, respectively; and when the terminate signal 86 or 20 is inputted, a change-over signal 18 is outputted to the sequential data read/write change-over circuit 80 and then an initiate signal 19 for a search of the pertinent kind is outputted to the sequential data search circuit 76.

On receiving the initial signal 87 as an input thereto, the sequential data read/write change-over circuit 80 connects, in order to allocate the sequential data storage 81 as an accumulate location of an object sequential data series, channels of input sequential data 25 and 35 to the channel of write data to be stored in the sequential data storage 81; moreover, channels of a read signal 36 to the sequential data read/write change-over circuit 80 and sequential data 37 to be delivered from the sequential data read/write change-over circuit 80 are connected to channels of a read signal 46 to the sequential data storage 82 and sequential data 47 read from the sequential data storage 82, and then a reset signal 40 is outputted to the sequential data storage 81. Thereafter, each time the sequential data 25 is inputted, sequential data 41 is delivered so as to be written in the sequential data storage 81.

Furthermore, on receiving a change-over signal 18 as an input thereto, in a case where the channels associated with the inputted sequential data 25 and 35 have been connected to the channel associated with the sequential data 41 to be written in the sequential data storage 81, the sequential data read/write change-over circuit 80 changes over for connection the channels associated with the sequential data 25 and 35 to be supplied as input data to the channel of the sequential data 45 to be written in the sequential data storage 82; whereas, in a case where the channels of the input data 25 and 35 have been connected to the channel of the sequential data 45 to be written in the sequential data storage 82, the sequential data read/write change-over circuit 80 changes over for connection the channel of the input data 25 and 35 to the channels of the sequential data 41 to be written in the sequential data storage 81.

Moreover, on receiving the change-over signal 18, in a case where the channels of the read signal 36 and the sequential data 37 to be delivered to the sequential data search circuit 76 have been connected to the channel of the sequential data 47 to be read from the sequential data storage 82, the sequential data read/write change-over circuit 80 changes over for connection the channels of the read signal 36 and the sequential data 37 to be delivered to the sequential data search circuit 76 to the channels of the read signal 42 and the sequential data 43 so as to supply a reset signal 44 to the sequential data storage 81. To the contrary, in a case where the channels of the read signal 36 and the sequential data 37 to be delivered to the sequential data search circuit 76 have been connected to the channels of the read signal 42 and the sequential data 43, the sequential data read/write change-over circuit 80 changes over for connection the channels associated with the read signal 36 and the sequential data 37 to the channels of the read signal 46 and the sequential data 47 so as to supply a reset signal 44 to the sequential data storage 82. Thereafter, each time the sequential data 35 is inputted thereto, the sequential data read/write change-over circuit 8 outputs the sequential data 41 or 45 to be written in the sequential data storage 81 or 82 having the channels thus connected.

Furthermore, each time a read signal 36 is inputted, a read signal 42 or 46 is respectively supplied to the sequential data storage 81 or 82 having the channels thus connected. When the sequential data 43 or 47 is respectively received from the sequential data storage 81 or 82, an output data 37 is outputted.

The sequential data storages 81–82 each includes a storage section in which inputted data are sequentially arranged and a pointer indicating a location of data last arranged. When the rest signals 40 and 44 are inputted as write data, the pointer is set to the first position of the storage section. When the sequential data 41 and 45 are inputted as write data, the current pointer is incremented by a data item so as to store the write data 41 and 45 in the location indicated by the resultant content of the pointer. When the read signals 42 and 46 are inputted, the sequential data 43 and 47 in the location indicated by the current pointer are outputted as read data and then the pointer decremented by a data item.

These data are data comprising four fields, namely, a node field, a kind field, a mark field, an attribute value vector pointer field or attribute data. The node field keeps a location of the node data, the kind field contains a kind of the node. In addition, the mark field retains a start symbol, an intermediate symbol, or an end symbol of the data; whereas the attribute value vector pointer field contains an attribute value vector pointer indicating a setting location (attribute value vector) of the value of an attribute to be propagated.

Consequently, the data constituted from the node, kind, mark, and attribute value vector pointer fields represent information concerning a sub-tree of a kind which has not been developed, whereas the attribute data indicates attribute information itself of a node already developed.

Incidentally, each circuit in the tree traversal apparatus 71 of FIG. 7 can be configured by means of a processor such as a microcomputer or a storage device. Moreover, the tree traversal apparatus 1 itself may be configured by means of a processor and a common memory so as to implement the functions of the respective circuits by use of programs in the processor.

FIG. 8 is a flowchart of an operation to generate a series of initial sequential data in the initial tree traversal circuit in the alternative embodiment according to the present invention. Incidentally, NODE indicates a location of the current node in the traversal, whereas NODE1 represents a location of a child of the current node.

As shown in FIG. 7, the first tree traversal circuit 73 effects the push operation and the pop operation for the tree traversal information storage 74, which inputs and accumulates saved information 23 at the end of the stack structure in response to the push operation of the initial tree traversal circuit 73 and which fetches information at the end of the stack structure and outputs attained information as return information 24 in response to the pop operation of the initial tree traversal circuit 73.

As shown in FIG. 8, when the tree traversal control circuit 72 first outputs the start or initiate signal 85, the initial tree traversal circuit 73 inputs the start signal 85 so as to initiate a traversal beginning from a root of the tree structure stored in the tree structure storage 75.

When the NODE is a node to generate a propagation information item (step 274), a unit of the storage location of the attribute value vector is reserved (step 275), and the location is set to the current attribute value vector pointer (step 276).

If the NODE is other than a node to generate propagation information (step 274), the attribute value vector pointer set by the parent thereof is assumed to be the current attribute value vector pointer.

Next, when the NODE is a root or when the kind of the NODE is different from that of the parent thereof, the node is assumed to be a root of the sub-tree (step 260), and start or initiate symbol data is generated for the node (step 261) so as to be written in the object sequential data accumulate circuit 81 via the sequential data read/write change-over circuit 80 (step 262).

Furthermore, the elder child of the NODE is set to the NODE1 (step 263). When the NODE1 is other than nil (step 264), in order to effect a traversal of the elder children of the descendant beginning from the elder child of the NODE, the current NODE, NODE1, and the kind of the parent as well as the current attribute value vector pointer are pushed into the current area of the sub-tree traversal information storage 74 (step 265), the information is set again (step 266), and control is returned to the label 1.

When the NODE is nil (step 264) and the younger brother is missing in the root of the sub-tree (step 267), if intermediate symbol data is found at the end of the sequential data series, the intermediate symbol data is deleted and then end symbol data is created so as to be arranged at the end of the sequential data series (step 268).

Thereafter, the pop operation is achieved on the sub-tree traversal information storage 74 at a point where control returns form the traversal on the child, thereby restoring present information (step 269).

In this case, if data to be popped is missing (step 270), the processing is terminated. If it is judged that the kind of the child is different from the own kind (step 270), intermediate symbol data is created for the node (step 270), intermediate symbol data is created for the node (step 271) so as to be written in the sequential data storage 81 via the sequential data read/write change-over circuit 80 (step 272).

Next, the younger brother of the NODE1 is set to the NODE1 (step 273) and then control is passed to the label 2.

Figure 9:
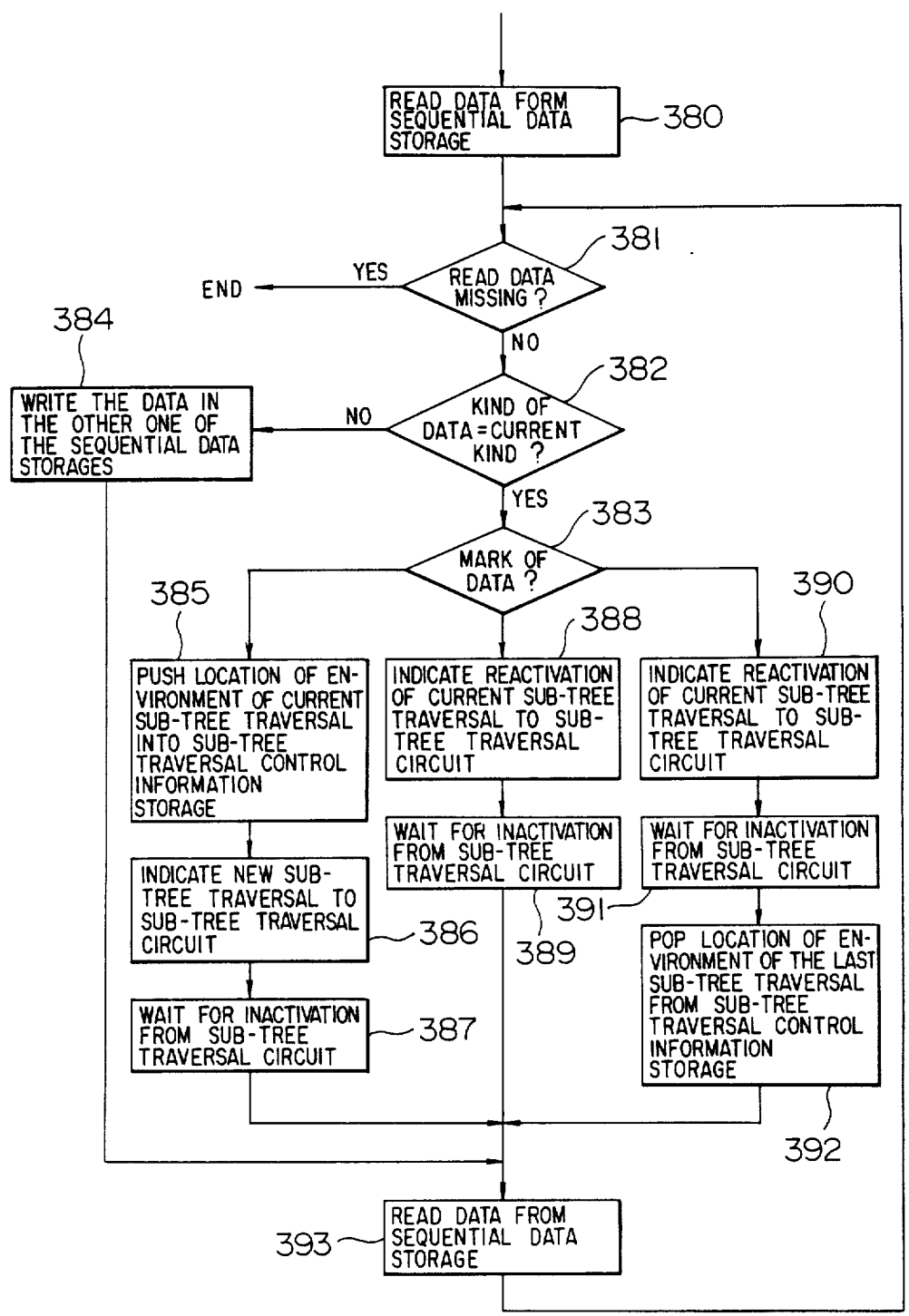
FIG. 9 is a flowchart of a processing to develop a series of original sequential data into a series of object sequential data in the alternative embodiment according to the present invention.

FIG. 9 is a flowchart showing an operation to develop an original sequential data series into an object sequential data series in the sequential data search circuit of the alternative embodiment according to the present invention. Incidentally, the sequential data storages 81 and 82 respectively accumulate the original sequential data series and the object sequential data series, and description will not be given here of the sequential data read/write change-over circuit 80.

As shown in FIG. 7, the sequential data search circuit 76 achieves a push operation for the sub-tree traversal control information storage 77, which receives as an input thereto saved information 30. The saved information 30 is stored at the end of the stack structure and is thereafter fetched in response to a pop operation of the sequential data search circuit 76 so as to be outputted as return information 31.

As shown in FIG. 9, on receiving the start signal 19 from the tree traversal control circuit 72, the sequential data search circuit 76 first reads data for a search of the original sequential data series beginning from the top thereof in the sequential data storage 81 (steps 380).

If the data to be read is null data (step 381), an end signal 20 is outputted to the tree traversal control circuit 72 and then control enters a state waiting for a start signal 19 from the tree traversal control circuit 72.

If there exists data to be read (step 381), it is determined whether or not the value of the kind field of the data is equal to the present kind (step 382).

If the kinds are different from each other (step 382), the data is written in the sequential data storage 82 (step 384).

In addition, when the value of the kind field of the data matches with the current kind, the mark of the data is then checked (step 383).

If the mark field contains a start or initiate symbol (step 383), a value (sub-tree traversal information pointer) indicating a location in the sub-tree traversal information storage 79 is selected from information necessary for the traversal of the present sub-tree and is pushed as saved information 30 into the sub-tree traversal control information storage 77 (step 385), and then a sub-tree traversal start or activate signal 32 associated with a location of a node in the node field and the attribute vector pointer of the initiate symbol data is sent to the sub-tree traversal circuit 78 to indicate the start of a new sub-tree traversal (step 386); thereafter, control waits for a sub-tree traversal stop or inactivate signal 34 from the sub-tree traversal circuit 8 (step 387).

Incidentally, the sub-tree traversal stop signal 34 includes a sub-tree traversal information pointer for the new sub-tree traversal and is temporarily kept in the sequential data search circuit 76 until the location of the environment of the present sub-tree traversal is pushed into the sub-tree traversal control information storage 77.

After this point, when the sub-tree traversal stop or inactivate signal 34 is inputted, data is read again from the sequential data storage 81 (step 393).

Furthermore, if the mark field contains an intermediate symbol (step 383), a sub-tree traversal reactivate signal 33 including the current sub-tree traversal information pointer is sent to the sub-tree traversal circuit 78 to indicate a reactivation of the sub-tree traversal (step 388), and then control waits for a sub-tree traversal inactivate signal 34 from the sub-tree traversal circuit 78 (step 389).

Thereafter, when the sub-tree traversal inactivate signal 34 is inputted, data is read again from the sequential data storage 81 (step 393).

Moreover, when the content of the mark field is an end symbol, like in the case of the intermediate symbol (steps 388 and 389), a reactivation of the current sub-tree traversal is indicated (step 390) and control waits for the sub-tree traversal inactivate signal 34 from the sub-tree traversal circuit 78 (step 391); thereafter, the latest sub-tree traversal information pointer associated with return information 31 is popped from the sub-tree traversal control information storage 77 (step 392).

Thereafter, data is read again from the sequential data storage 81 (step 393), and if the data is null data (step 381), an end signal 20 is outputted to the tree traversal control circuit, and then control waits for an initiate signal 19 from the tree traversal control circuit 72.

Figure 10:
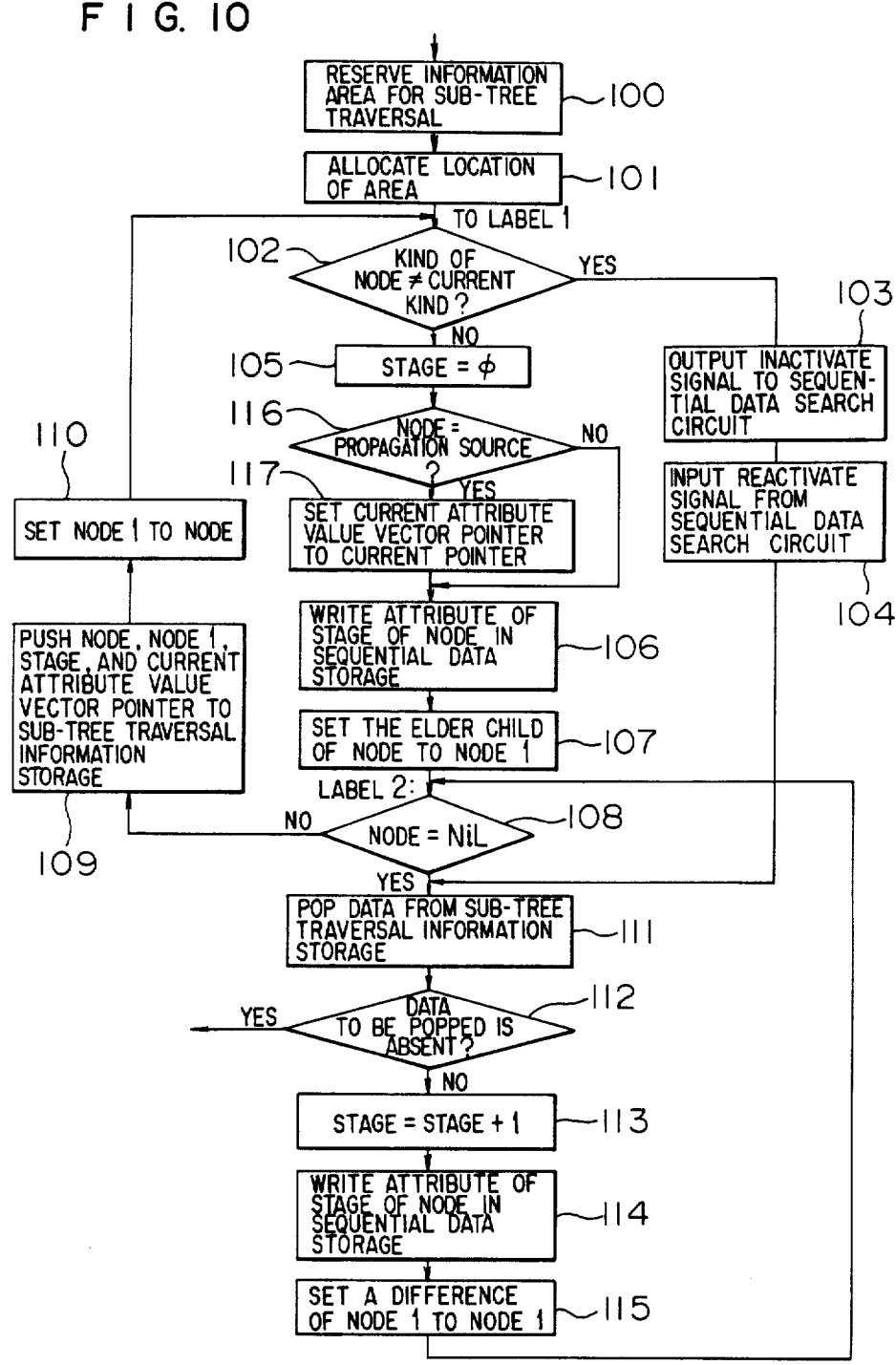
FIG. 10 is a flowchart of an operation to develop a tree structure into a series of object sequential data in a sub-tree traversal circuit of the alternative embodiment according to the present invention.

FIG. 10 is a flowchart of processing to develop a tree structure into an object sequential data series in the sub-tree traversal circuit of the alternative embodiment according to the present invention. Incidentally, NODE indicates a location of the current node in the traversal and NODE1 designates a location of a child of the present node. Moreover, STAGE denotes a traversal stage of the NODE.

Like in the case of FIG. 7, according to a generate operation of the sub-tree traversal circuit 78, the sub-tree traversal information storage 79 reserves an area corresponding to a new sub-tree when a generate signal 48 is received as an input thereto and then outputs a sub-tree traversal information pointer 49 indicating the location to the sub-tree traverse circuit 78. Thereafter, in response to a push operation of the sub-tree traversal circuit 79, saved information 38 is inputted and is then accumulated at the end of the stack structure in an area specified by the sub-tree traversal information pointer associated with the saved information. In response to a pop operation of the sub-tree traversal circuit 78, similarly, information at the end of the stack structure in an area specified is fetched and is outputted as return information 39.

As shown in FIG. 10, on receiving as an input thereto a start signal 32 including a location of a node and an attribute vector pointer from the sequential data search circuit 76, the sub-tree traversal circuit 78 sets the attribute vector pointer value as the value of the present attribute value vector pointer and effects a traversal of the tree structure in the tree structure storage 75 with the node set as the root thereof. In this operation, the sub-tree traversal circuit 78 outputs a generation signal 48 to the sub-tree traversal information storage 79 so as to receive the sub-tree traversal information pointer 49 (steps 100 and 101).

Next, it is checked whether or not the kind of the NODE matches with the current kind (step 102).

When the kind of the NODE is different from the pertinent kind (step 102), a sub-tree traversal inactivate signal 34 including the sub-tree traversal information pointer is delivered to the sequential data search circuit 76 and the operation is inactivated (step 103).

Thereafter, on receiving the sub-tree traversal signal 33 from the sequential data search circuit 76, the sub-tree traversal information pointer associated with the sub-tree traversal reactivate signal 33 is set as a pointer to indicate the current area in the sub-tree traversal information storage 9, and then the operation is reactivated (step 104).

When the kind of the NODE matches with the pertinent kind (step 102), if it is determined (step 116) that a propagation information item is to be generated for the node depending on the attribute value vector pointer of the NODE (step 105), the storage location of the attribute value vector assigned to the node is set at the current attribute value vector pointer (step 117).

Next, an attribute of the NODE for STAGE=0 is written as sequential data 50 in the sequential data storage 82 (step 106).

Furthermore, the elder child of the NODE is set to the NODE1 (step 107).

When the NODE1 is other than nil (step 108), in order to effect a traversal of the elder children of the descendant beginning from the elder child of the NODE, the current NODE, NODE1, STAGE, and the attribute value vector pointer value are pushed into the current area of the sub-tree traversal information storage 9 (step 109), information about the child is set again (step 110), and control is returned to the label 1.

When the NODE is nil (step 108), the pop operation is achieved on the current area of the sub-tree traversal information storage 79 at a point where control returns from the operation on the child, thereby restoring present information (step 111).

In this case, if data to be popped is missing (step 112), the traversal of this sub-tree is assumed to have been completed, the area indicated by the sub-tree traversal information pointer is abandoned, a sub-tree traversal inactivate signal 34 is outputted to the sequential data search circuit 76, and then control waits for the sub-tree traversal initiate signal 32 or the sub-tree traversal reactivate signal 33.

If there exists return information, the STAGE undergoes a count-up operation (step 113), the attribute of the NODE at the STAGE is written as the sequential data 50 in the sequential data storage 82 (step 114), the younger brother of the NODE1 is set to the NODE1 for the traversal of the younger brother (step 115), and then control returns to the label 2.

In a case where the area indicated by the sub-tree traversal information pointer associated with the sub-tree traversal reactivate signal 33 has already been abondoned, the sub-tree traversal inactivate signal 34 is outputted without effecting the processing above, and then control waits for the sub-tree traversal initiate signal 32 or the sub-tree traversal reactivate signal 33.

According to the present invention, for a tree traversal to process data in a tree structure, in a case where the processing of nodes in the traversal order thereof is impossible and hence a plurality of traversals are necessary, the traversal is effected only in the periphery of the object node, which can consequently improve the processing efficiency.

Furthermore, also in a case where the object processing cannot be coped with a plurality of traversals, for example, because information necessary for the processing of the respective nodes cannot be stored in a batch, the present invention enables to attain a node processing result like the result obtained when the entire tree is processed through a traversal.

Moreover, when attribute propagation from a node to a descendant takes place, if the timing when the propagation attribute is generated is different from that when the node of the descendant is evaluated by referencing the node of the propagation source, an appropriate node processing result can be attained because of the propagation attribute.

While the present invention has been described with reference to the particular illustrative embodiments, it is not restricted by those embodiments but only by the appended claims. It is to be appreciated that those skilled in the art can change and modify the embodiments without departing from the scope and spirit of the invention.

I claim:

1. A traversal method in a system including first and second memory means storing data of a tree structure having nodes and processing means for effecting a traversal of the tree structure data comprising:
    a first step for achieving the traversal of the tree structure data so as to recognize as a sub-tree a group of nodes which have a same kind and which are linked with each other;
    a second step for arranging and for storing in said first memory means, based on the recognition of said first step, a series of data including a location of a node of the tree structure undergone the traversal, a kind of the node, and a symbol indicating a positional relationship between the node and a boundary of an area to which the node belongs;
    a third step for searching the sequential data series sequentially arranged in said first memory means by said second step so as to copy onto said second memory means data of sub-trees not belonging to the kind associated with the traversal; and
    a fourth step operative when a sub-tree belonging to the pertinent kind is again detected for effecting a traversal on the sub-tree so as to store an attribute of the sub-tree in said second memory means.

2. A traversal method having:
    first and second store means for storing tree structure data constituted from nodes, each said node including:
    an attribute indicating a traversal stage in the tree structure, and
    a kind restricting an evaluation order of the attribute for each node in which an evaluation result of an attribute corresponding to the traversal stage of each node of the tree structure data is stepwise arranged according to a depth-first order in said store means in a sequential fashion comprising:
    a first step for recognizing as a sub-tree a group of nodes which have a same kind and which are linked with each other,
    said first step, during a traversal of a root of the sub-tree, sequentially arranging symbols indicating an initiate position of the sub-tree and an end position thereof in the preorder and in the postorder,
    said first step sequentially arranging a symbol indicating an intermediate position of the sub-tree in said first store means when control returns from a traversal of children with kinds different from the kind in each leaf of the sub-tree;
    a second step, while searching a series of data sequentially arranged for each said kind by said first step, for copying the initiate symbol, the intermediate symbol, and the end symbol of the sub-tree not belonging to the kind onto said second store means,
    said second step, when the initiate symbol of a sub-tree belonging to the kind is detected, indicating an activation of a traversal of said sub-tree, said second step, when the intermediate and end symbols are detected, indicating a reactivation of a traversal of said sub-tree; and a third step responsive to an indication of said second step for effecting a traversal of the sub-tree belonging to the kind so as to develop an attribute of the sub-tree in said second store means.

3. A tree traversal apparatus having:

accumulating means for accumulating tree structure data constituted from nodes, each said node including:

an attribute indicating a traversal stage in the tree structure, and a kind restricting an evaluation order of the attribute for each node in which an evaluation result of an attribute corresponding to the traversal stage of each node of the tree structure data is stepwise arranged according to a depth-first order in said store means in a sequential fashion comprising:

means for accumulating as an original sequential data a series of initial sequential data constituted with said node information of the node accumulated in said tree structure accumulate means;

means for receiving an initial initiate signal initiating the tree traversal apparatus so as to effect a tree traversal and for writing the initial sequential data series in said original sequential data accumulate means while reading information possessed by the node from the tree structure data accumulated in said accumulate means;

means for accumulating as an object sequential data series an attribute of each said node of a kind as a current evaluation object and sequential data with a kind other than the kind of the evaluation object;

means for recognizing as a sub-tree a group of nodes which have a same kind and which are linked with each other means for accumulating and for controlling location information of data indicating a state of the traversal processing of the sub-tree;

means for reading sequential data from said original sequential data accumulate means so as to write the sequential data in said object sequential data accumulate means and for controlling the sub-tree traversal processing while referencing and updating data indicating a state of the traversal processing of the sub-tree stored in said sub-tree traversal control information accumulate means so as to search the sequential data; and means for reading from said tree structure accumulate means, based on a root of a sub-tree specified by said sequential data search means, information of nodes which are linked with each other to configure said sub-tree so as to write an attribute of each said node in said object sequential data accumulate means.

4. A traversal method in a system having:

first and second store means for storing tree structure data constituted from nodes, each said node including:

an attribute indicating a traversal stage in the tree structure, and a kind restricting an evaluation order of the attribute for each node in which an evaluation result of an attribute corresponding to the traversal stage of each node of the tree structure data is stepwise arranged according to a depth-first order in said store means in a sequential fashion comprising:

a first step for recognizing as a sub-tree a group of nodes which have a same kind and which are linked with each other, said first step recognizing as a root a node generating information to be an object of a propagation, and recognizing as a propagation enable area in which said propagation information can be propagated an area excepting the node which is at the highest level among the nodes in which the propagation information is not referenced, said first step retaining an attribute value vector keeping said entire propagation information in a node of a propagation source of said propagation information so as to store a value indicated by said attribute value vector in the node of the propagation source, and sequentially arranging in the preorder and in the postorder, during a traversal of a root of the sub-tree, symbols indicating an initiate position and an end position of the sub-tree keeping a location of the attribute value vector of he propagation source of an ancestor nearest to the root, said first step sequentially arranging a symbol indicating an intermediate position of the sub-tree in one of said first and second store means, at a point when control returns from a traversal of a child with a kind different from the kind in each leaf of the sub-tree;

a second step for searching a series of data sequentially arranged for each said kind by said first step so as to copy the initiate symbol, the intermediate symbol, and the end symbol of the sub-tree not belonging to the kind onto said second store means, said second step, when the initiate symbol of a sub-tree belonging to the kind is detected, indicating an initiation of a traversal of said sub-tree, said second step, when the intermediate symbol and the end symbol are detected, indicating a reactivation of the traversal of said sub-tree; and a third step responsive to an indication of said second step for effecting a traversal of the sub-tree belonging to the kind so as to develop an attribute of the sub-tree in the other one of said two store means.

5. A traversal apparatus in a system including first and second memory means storing data of a tree structure having nodes and memory means for effecting a traversal of the tree structure data comprising:

first means for achieving a traversal of the tree structure data so as to recognize as a sub-tree a group of nodes which have a same kind and which are linked with each other;

second means for arranging and for storing in said first memory means, based on the recognition of said first means, a series of data including a location of a node of the tree structure undergone the traversal, a kind of the node, and a symbol indicating a positional relationship between the node and a boundary of an area to which the node belongs;

third means for searching the sequential data series sequentially arranged in said first memory means by said second means for copying onto said second memory means data of sub-trees not belonging to the kind associated with the traversal; and fourth means operative when a sub-tree belonging to the pertinent kind is again detected, for effecting a traversal on the sub-tree so as to store an attribute of the sub-tree in said second memory means.

* * * * *